(12) United States Patent
Sakai

(10) Patent No.: US 8,621,469 B2
(45) Date of Patent: Dec. 31, 2013

(54) IMAGE PROCESSING JOB CONTROL SYSTEM WITH ACCESS CONTROL TICKET INCLUDING FUNCTION RESTRICTION BASED ON USER, TIME OF REQUEST AND UPPER LIMIT ON EXCEPTIONAL OUTPUT COUNT

(75) Inventor: Tetsuo Sakai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1149 days.

(21) Appl. No.: 11/946,465

(22) Filed: Nov. 28, 2007

(65) Prior Publication Data

US 2008/0134186 A1 Jun. 5, 2008

(30) Foreign Application Priority Data

Dec. 4, 2006 (JP) .................................. 2006-327634
Oct. 31, 2007 (JP) .................................. 2007-283796

(51) Int. Cl.
*G06F 9/46* (2006.01)
(52) U.S. Cl.
USPC .... 718/102; 358/1.13; 358/1.15; 358/426.02; 358/448; 726/10; 726/17; 726/20
(58) Field of Classification Search
USPC .............. 718/1, 102; 358/1.13, 1.15, 426.02, 358/448; 726/10, 17, 20
See application file for complete search history.

(56) References Cited

U.S. PATENT DOCUMENTS

| | | | | |
|---|---|---|---|---|
| 5,263,165 A | * | 11/1993 | Janis | 711/163 |
| 5,450,593 A | * | 9/1995 | Howell et al. | 726/21 |
| 6,173,209 B1 | * | 1/2001 | Laval et al. | 700/91 |
| 6,466,748 B2 | * | 10/2002 | Tamai et al. | 399/16 |
| 7,657,753 B2 | * | 2/2010 | Sawada | 713/183 |
| 7,710,593 B2 | * | 5/2010 | Kamijima et al. | 358/1.18 |
| 8,228,521 B2 | * | 7/2012 | Osamura et al. | 358/1.14 |
| 2002/0042884 A1 | * | 4/2002 | Wu et al. | 713/201 |
| 2004/0125402 A1 | * | 7/2004 | Kanai et al. | 358/1.15 |
| 2004/0162787 A1 | * | 8/2004 | Madison et al. | 705/64 |
| 2005/0094182 A1 | * | 5/2005 | Reese et al. | 358/1.14 |
| 2005/0165759 A1 | | 7/2005 | Sakai | 707/3 |
| 2005/0246620 A1 | * | 11/2005 | Ebata | 715/500 |
| 2005/0273852 A1 | * | 12/2005 | Ferlitsch | 726/17 |
| 2006/0077449 A1 | * | 4/2006 | Lum et al. | 358/1.15 |
| 2006/0187486 A1 | | 8/2006 | Tsuchitoi | 358/1.15 |
| 2006/0274371 A1 | | 12/2006 | Sakai | 358/1.15 |
| 2007/0186212 A1 | * | 8/2007 | Mazzaferri et al. | 718/1 |

FOREIGN PATENT DOCUMENTS

| | | | | |
|---|---|---|---|---|
| JP | 2000-357215 | | 12/2000 | ............ G06K 19/00 |
| JP | 2000357215 A | * | 12/2000 | |
| JP | 2001-188663 | | 7/2001 | |

(Continued)

*Primary Examiner* — Meng An
*Assistant Examiner* — Abu Ghaffari
(74) *Attorney, Agent, or Firm* — Fitzpatrick, Cella, Harper & Scinto

(57) ABSTRACT

An ACT generation unit (208) in an access control apparatus generates an ACT in a form in which the ACT includes function restriction information based on the time period. At this time, in response to an ACT request from a client PC, a list (401) which describes function restriction information based on the time period is referred to based on user information (404) and time information (405) representing the request time. A regular time ACT (410) and overtime ACT (411) are generated in accordance with the request time. By replying the ACT to the client PC, a print job is transferred together with the ACT to a printing apparatus, allowing access control based on the time period.

6 Claims, 22 Drawing Sheets

(56) References Cited

FOREIGN PATENT DOCUMENTS

| | | | |
|---|---|---|---|
| JP | 2001188663 A | * | 7/2001 |
| JP | 2002-215373 | | 8/2002 |
| JP | 2002-342053 | | 11/2002 |
| JP | 2006-268837 | | 10/2006 |

* cited by examiner

FIG. 11

| | |
|---|---|
| USER INFORMATION | UserA |
| PRINT JOB ID | 12345 |
| OUTPUT PRIORITY INFORMATION | HIGH |
| PRINT JOB NAME | SPECIFICATION 1 |
| PRINT REQUEST TIME | 20:00 |

FIG. 12

| USER INFORMATION | SPECIFIED EXCEPTIONAL OUTPUT COUNT | ACTUAL EXCEPTIONAL OUTPUT COUNT |
|---|---|---|
| UserA | 5 | 3 |
| UserB | 5 | 5 |
| UserC | 20 | 7 |
| UserD | 20 | 10 |

F I G. 13A
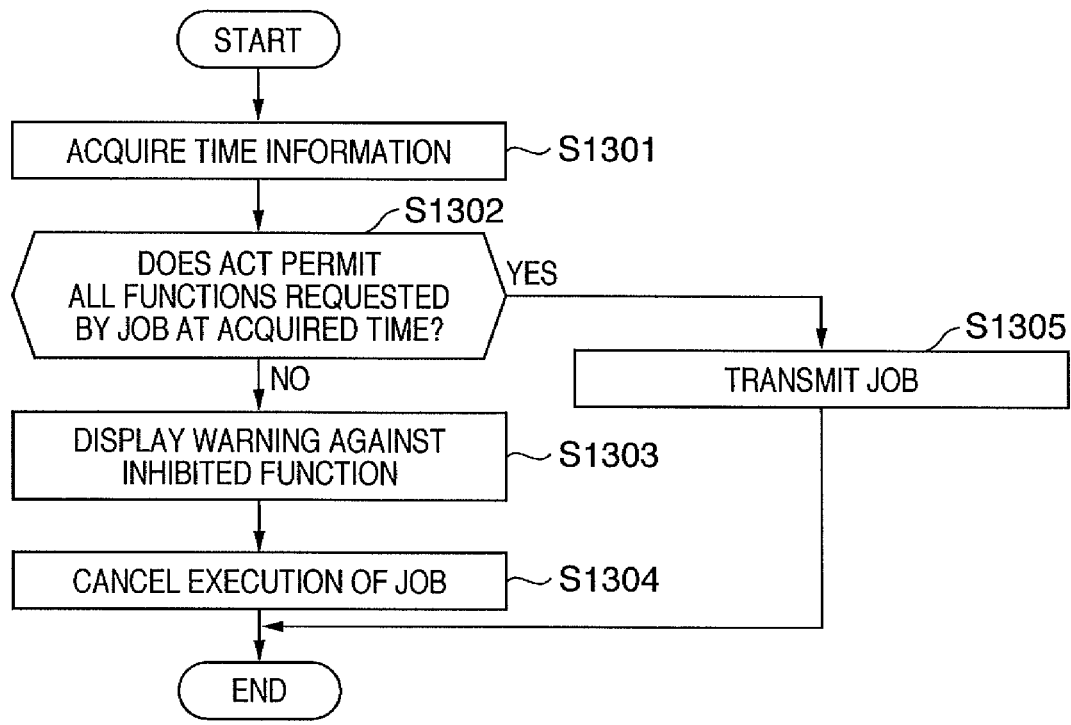

FIG. 16

| USER INFORMATION | UserA |
| --- | --- |
| PRINT JOB ID | 12345 |
| OUTPUT PRIORITY INFORMATION | HIGH |
| PRINT JOB NAME | SPECIFICATION 1 |
| PRINT REQUEST TIME | 14:00 |
| PRINT EXECUTION TIME | 21:00 |

FIG. 19

MANAGEMENT INFORMATION OF EXCEPTIONAL PRINT LOG

| USER NAME | JOB NAME | OUTPUT DATE & TIME |
|---|---|---|
| UserA | SPECIFICATION | 2006/03/31 20:05:10 |
| UserB | DESIGN | 2006/03/30 21:55:21 |
| UserA | REPORT | 2006/03/24 22:30:15 |
|  |  |  |

IMAGE PROCESSING JOB CONTROL SYSTEM WITH ACCESS CONTROL TICKET INCLUDING FUNCTION RESTRICTION BASED ON USER, TIME OF REQUEST AND UPPER LIMIT ON EXCEPTIONAL OUTPUT COUNT

BACKGROUND OF THE INVENTION

1. Field of the Invention

The present invention relates to a job processing technique for restricting the function of an image processing apparatus when the image processing apparatus executes a job in accordance with a user instruction.

2. Description of the Related Art

Owing to a growing number of management items in management of recent printing apparatuses, a growing number of printing apparatuses to be managed, and the like, it is required to reduce the TCO (Total Cost of Ownership) by a person in charge of management of the printing apparatus. At the same time, it is also required to reduce the running cost of the printing apparatus by restricting the time period during which the printing apparatus is available.

Conventionally when controlling permission/inhibition of the use of a printing apparatus in a printing apparatus management system, the use of the printing apparatus is restricted for each user of the printing apparatus or a group to which the user belongs. Alternatively, the number of print sheets is restricted.

There is disclosed a technique for controlling permission/inhibition of the use of a printing apparatus by using the ID card of a user, and time period information which defines a time period during which the printing apparatus is available for a department to which the user belongs (see, e.g., Japanese Patent Laid-Open No. 2000-357215). According to this technique, by referring to department information of an ID card inserted by a user of the printing apparatus, it is determined whether the time period during which the printing apparatus is available in the department has come, or the number of print sheets has reached the upper limit. Based on the determination result, whether to permit/inhibit the use of the printing apparatus is controlled.

However, the following problems arise in a management method for the conventional printing apparatus management system.

When permission/inhibition conditions for the use of a printing apparatus do not include the time period condition, any user permitted to print can print regardless of the time. Permission/inhibition of use cannot be controlled based on the time period.

Even when the time period condition is introduced into permission/inhibition control for the use of a printing apparatus, it is difficult to control a time-designated job in which the time when printing is designated and that when printing is executed are different.

If permission/inhibition of use of all functions of recent multifunctional printing apparatuses are controlled uniformly depending on the time period, even functions which should be originally available all day long are inhibited depending on the time period, failing fine control.

The present invention has been made to overcome the above-described problems one by one or at once, and has as its object to provide a mechanism of finely, flexibly restricting execution of a job using the functions of an image processing apparatus.

SUMMARY OF THE INVENTION

As a means for achieving the above object, an access control apparatus according to the present invention comprises the following arrangement.

According to one aspect of the present invention, there is provided a job processing method for an image processing system in which an information processing apparatus which requests an image processing apparatus to process a job, and an access control apparatus which issues, to the information processing apparatus, an access control ticket including function restriction information for restricting use of a function of the image processing apparatus for each user are connected via a network, the method comprising: a request step of causing the information processing apparatus to request an access control ticket of the access control apparatus; a generation step of causing the access control apparatus to generate an access control ticket including function restriction information corresponding to a time period during which the request in the request step is accepted; a reply step of causing the access control apparatus to reply the access control ticket generated in the generation step to the information processing apparatus; a comparison step of comparing execution time information of the job to be executed with the time period corresponding to the function restriction information included in the access control ticket replied in the reply step; and an execution step of, when in the comparison step, the execution time information of the job to be executed falls within the time period corresponding to the function restriction information included in the access control ticket replied in the reply step, executing the job corresponding to the function of the image processing apparatus, use of which is restricted based on the access control ticket.

According to another aspect of the present invention, there is provided an image processing system in which an information processing apparatus which requests an image processing apparatus to process a job, and an access control apparatus which issues, to the information processing apparatus, an access control ticket including function restriction information for restricting use of a function of the image processing apparatus for each user are connected via a network, the system comprising: a request unit adapted to request an access control ticket of the access control apparatus from the information processing apparatus; a generation unit adapted to generate, in the access control apparatus, an access control ticket including function restriction information corresponding to a time period during which the request by the request unit is accepted; a reply unit adapted to reply the access control ticket generated by the generation unit from the access control apparatus to the information processing apparatus; a comparison unit adapted to compare execution time information of the job to be executed with the time period corresponding to the function restriction information included in the access control ticket replied by the reply unit; and an execution unit adapted to, when as a result of the comparison by the comparison unit, the execution time information of the job to be executed falls within the time period corresponding to the function restriction information included in the access control ticket replied by the reply unit, execute the job corresponding to the function of the image processing apparatus, use of which is restricted based on the access control ticket.

With this arrangement, execution of a job using the functions of an image processing apparatus can be finely, flexibly restricted as compared with a conventional mechanism.

Further features of the present invention will become apparent from the following description of exemplary embodiments (with reference to the attached drawings).

BRIEF DESCRIPTION OF THE DRAWINGS

FIG. 11 is a table showing an example of print job information in the embodiment;

FIG. 12 is a table showing an example of an exceptional output table which defines the exceptional output count in the embodiment;

FIG. 13A is a flowchart showing job processing by a client PC in the embodiment;

FIG. 16 is a table showing an example of timer job information in the second embodiment;

FIG. 19 is a table showing an example of an exceptional printing log in the second embodiment;

DESCRIPTION OF THE EMBODIMENTS

The present invention will be described in detail based on preferred embodiments with reference to the accompanying drawings. Arrangements set forth in the following embodiments are merely examples, and the present invention is not limited to illustrated arrangements.

<First Embodiment>
Outline of System Configuration

Figure 1:
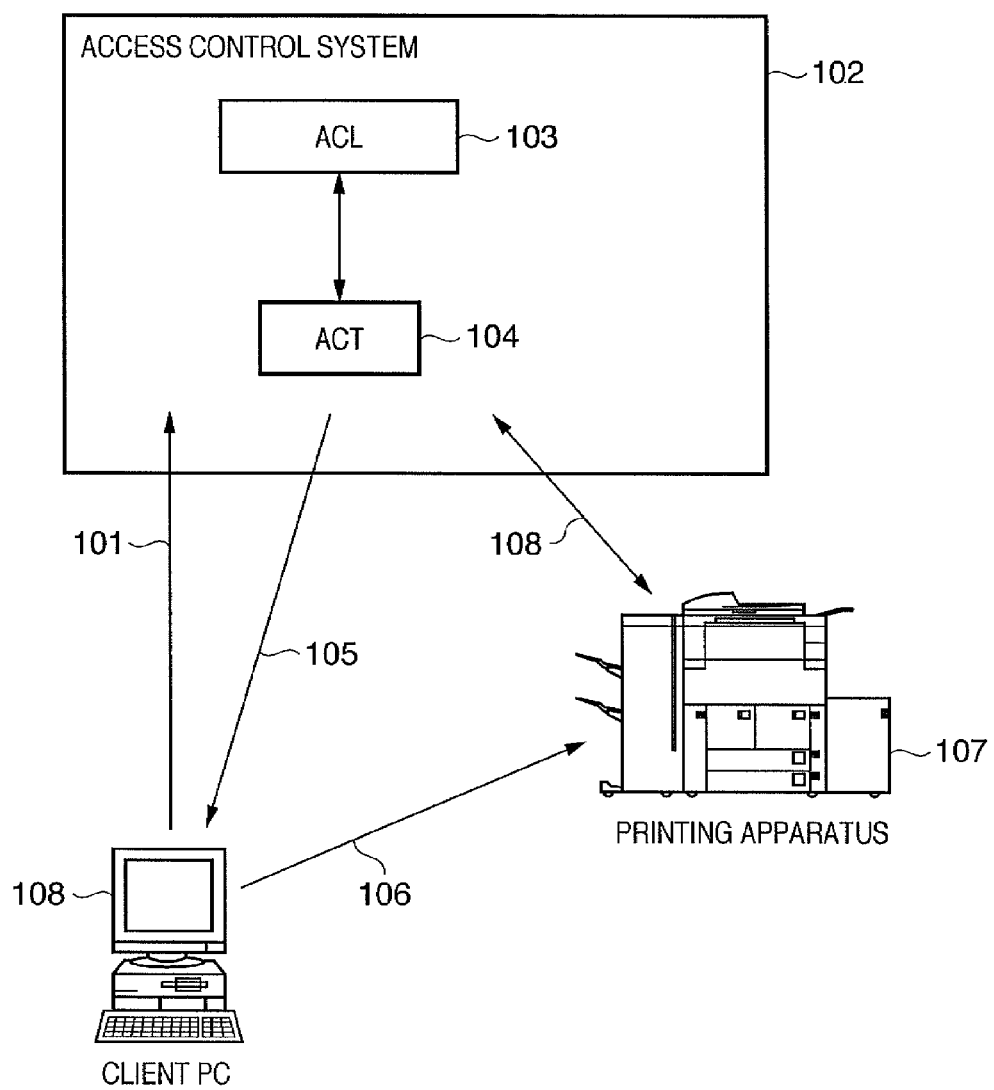
FIG. 1 is a view showing an outline of the operation of a printing apparatus management system in an embodiment of the present invention.

FIG. 1 is a view showing an outline of the configuration and operation of an image processing system according to the first embodiment. In FIG. 1, a user who is to print uses an information processing apparatus as a client PC 108. The user activates an application program or the like on the client PC 108, and executes print processing via the application program. The client PC 108 functions as a requesting apparatus which requests a printing apparatus to process a job. The client PC 108 will be described as a typical example of the requesting apparatus. Needless to say, the requesting apparatus is not limited to the client PC 108. For example, when performing a copy job, the printing apparatus itself functions as the requesting apparatus. Various types of jobs such as a print job, copy job, and box print job are assumable as jobs to which the embodiment is applied. As a representative job, a print job will be exemplified.

When the client PC 108 executes printing, the application program transfers print data to a printer driver in the client PC 108. The printer driver prepares for output of the print job to a target printing apparatus 107. At this time, for example, the printer driver in the client PC 108 issues an access control thicket (to be referred to as ACT hereinafter) issue request 101 to an access control system 102. Upon receiving the ACT issue request 101, the access control system 102 identifies user information contained in the issue request. Based on the user information, the access control system 102 acquires information on a user from a user information management server (not shown) which constitutes the system.

The ACT contains function restriction information representing whether to permit or inhibit the use of each function of the image processing apparatus (printing apparatus). The function restriction information can also be information representing whether to permit or inhibit designation of the use of each function of the image forming apparatus by a job. Functions of the printing apparatus are, for example, color printing, stapling, and box print. As a typical examples the ACT is acquired when printing is requested in the following description, but the acquisition timing is not limited to this. For example, the ACT may also be acquired before a print request.

The access control system 102 which controls access by issuing an ACT including function restriction information for restricting the use of a function of the image processing apparatus for each user will be described. To acquire user access information, the access control system 102 accesses an access control-information list (to be referred to as ACL hereinafter) 103 using designated user information as a key. The ACL 103 describes access restriction information of the printing apparatus 107 for each user. An ACT 104 is generated based on access control information obtained by referring to the ACL 103. The ACT 104 is replied as ACT issue 105 to the client PC 108 in which the printer driver, which has requested printing, runs.

Then, the printer driver of the client PC 108 determines whether the received ACT permits all functions necessary for the job to be requested of the printing apparatus. If the received ACT does not permit all or some functions to be executed by the job, the printer driver outputs a warning to this effect to the user. If the ACT permits all functions to be executed by the job, the printer driver transmits a print job 106 to the printing apparatus 107 together with the ACT acquired as the ACT issue 105.

To verify the validity of the ACT transmitted together with the print job 106, the printing apparatus 107 transmits ACT authentication 109 to the access control system 102. The access control system 102 sends back the result of ACT validity verification to the printing apparatus 107. The printing apparatus 107 permits printing when the validity of the ACT acquired from the client PC 108 is authenticated, or cancels the print job when the validity is not authenticated. This can prevent illicit printout or unauthorized access to the printing apparatus 107. As the ACT validity verification method, for example, encrypted information which can be decrypted by only the access control system 102 can be embedded in the ACT to determine whether the ACT contains the encrypted information.

Figure 2:
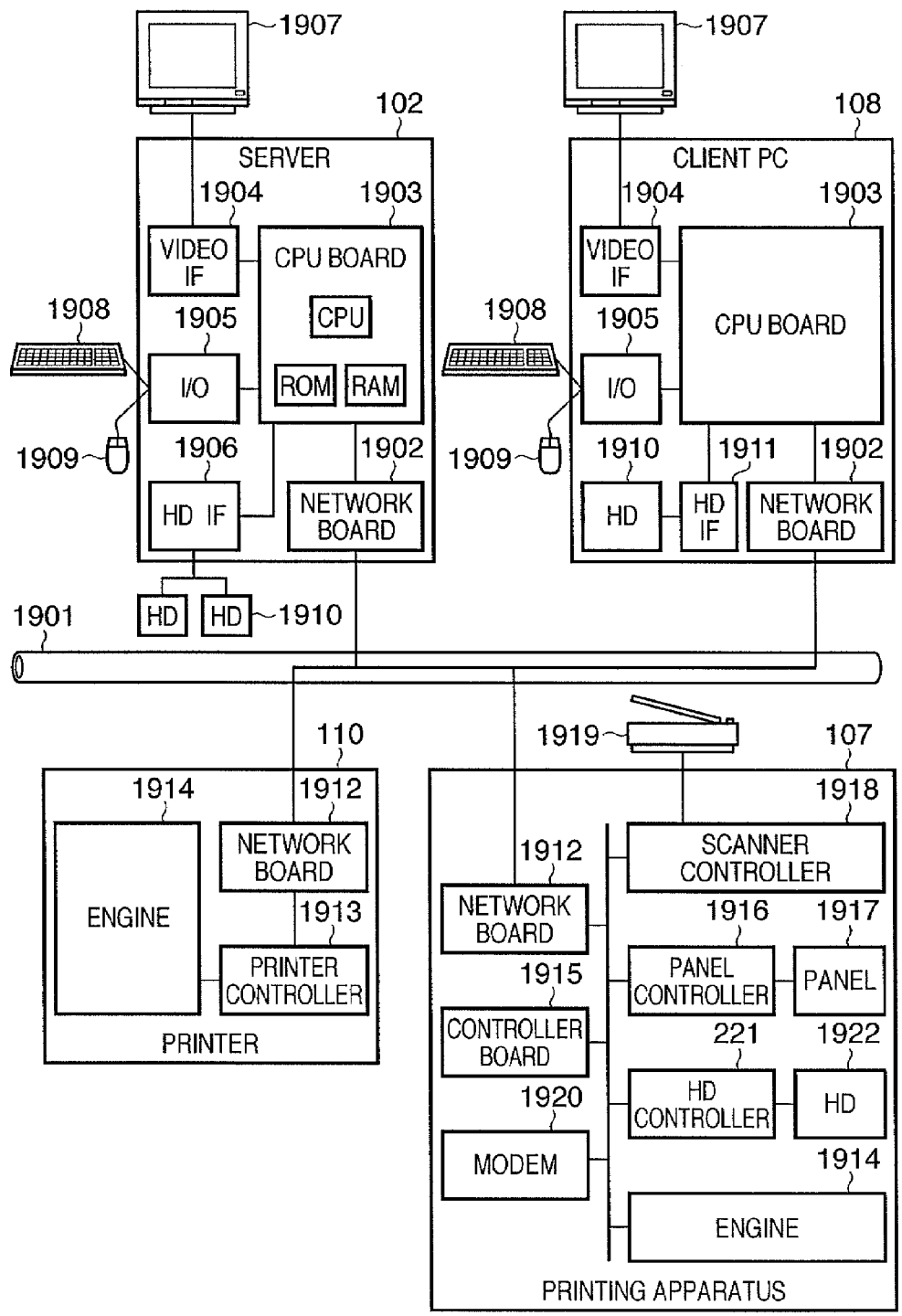
FIG. 2 is a block diagram showing the characteristic module configuration of an access control server in the embodiment.

FIG. 2 is a block diagram showing the main hardware modules of devices in the first embodiment shown in FIG. 1. The functions of the hardware modules of the devices will be explained with reference to FIG. 2.

In FIG. 2, a network line 1901 is a physical line which builds a network between devices. The network line 1901 is generally a twisted pair cable, coaxial cable, or optical fiber.

The access control system 102 shown in FIG. 1 is implemented in a server shown in FIG. 2, and thus will be called a server 102. Hardware modules which constitute the server 102 are a network board 1902, CPU board 1903, video interface 1904, I/O interface 1905, and disk interface 1906. Other hardware modules of the server 102 are a CRT 1907, keyboard 1908, mouse 1909, and hard disk drive (HD) 1910, which are connected to the above-mentioned modules. In the HD 1910, a plurality of hard disk units are parallel-connected to ensure high data transfer speed and high reliability. Databases may also be built in these hard disk units in accordance with, for example, the type of software running on the server 102.

Similar to the server 102, hardware modules which constitute the client PC 108 are a network board 1902, CPU board 1903, video interface 1904, I/O interface 1905, and disk interface 1911. Other hardware modules of the client PC 108 are a CRT 1907, keyboard 1908, mouse 1909, and HD 1910, which are connected to the above-mentioned modules. Printer driver software in the client PC 108 is stored in the HD 1910 connected to the disk interface 1911, and is called via the OS when application software requests printing.

Hardware modules which constitute the printing apparatus 107 are a network board 1912 compatible with a peripheral device, a controller board 1915 for a multifunctional copying apparatus, and a print engine 1914 serving as a printing means. Other hardware modules of the printing apparatus 107 are an operation panel controller 1916, operation panel 1917, scanner controller 1918, scanner unit 1919, modem 1920, hard disk IF 1921, and HD 1922. As represented by a printer 110 in FIG. 2, the system according to the embodiment can also comprise a plurality of printing apparatuses in addition to the printing apparatus 107. The printing apparatus 107 receives a print job issued by processes shown in the flowcharts of FIGS. 13A and 15 (to be described later) and executes processes shown in the flowcharts of FIGS. 13B and 18 (to be described later).

Figure 3:
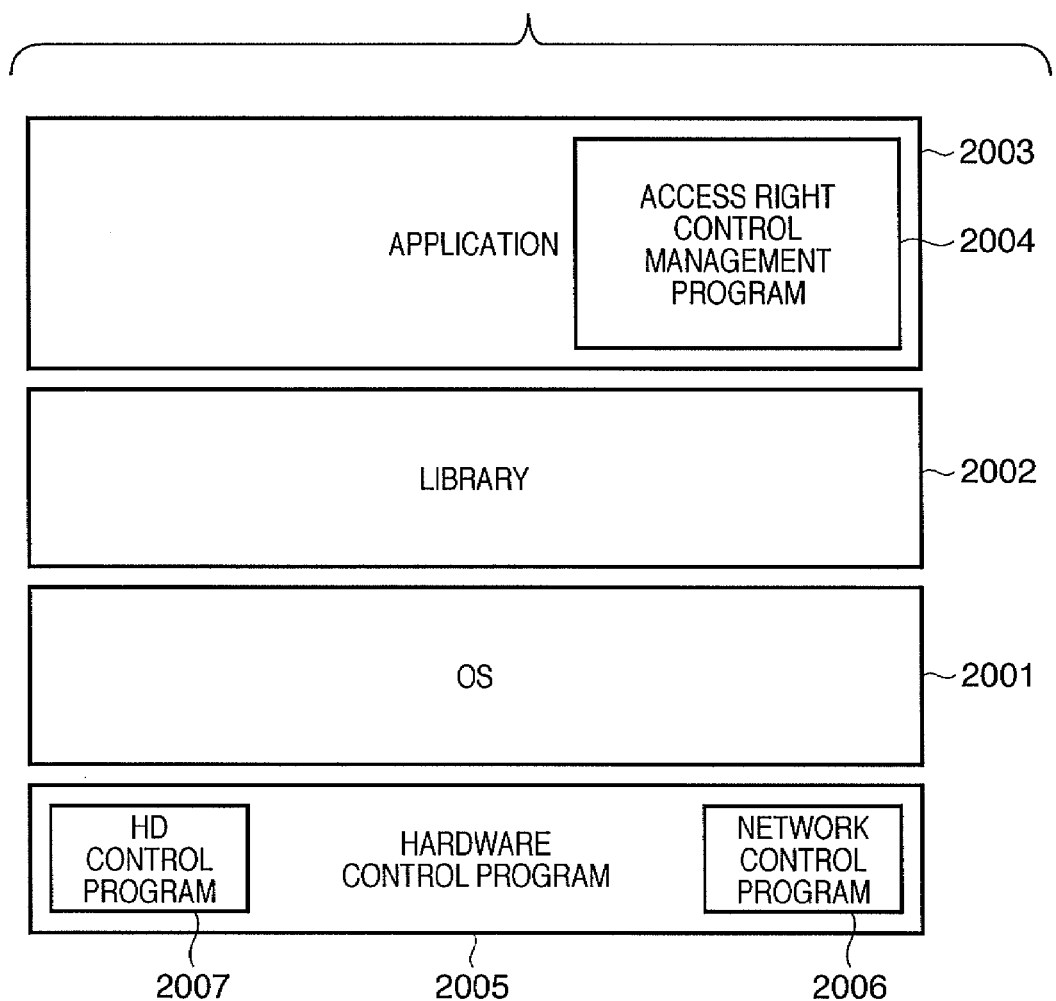
FIG. 3 is a block diagram showing the software module configuration of the server in the embodiment.

FIG. 3 is a block diagram showing the software module configuration of the server 102. In FIG. 3, the server 102 includes an operating system (OS) 2001, library 2002, and application 2003. As part of the application 2003, the server 102 includes an access right control management program 2004. As parts of a hardware control program 2005, the server 102 includes a network control program 2006 and hard disk (HD) control program 2007.

Figure 4:
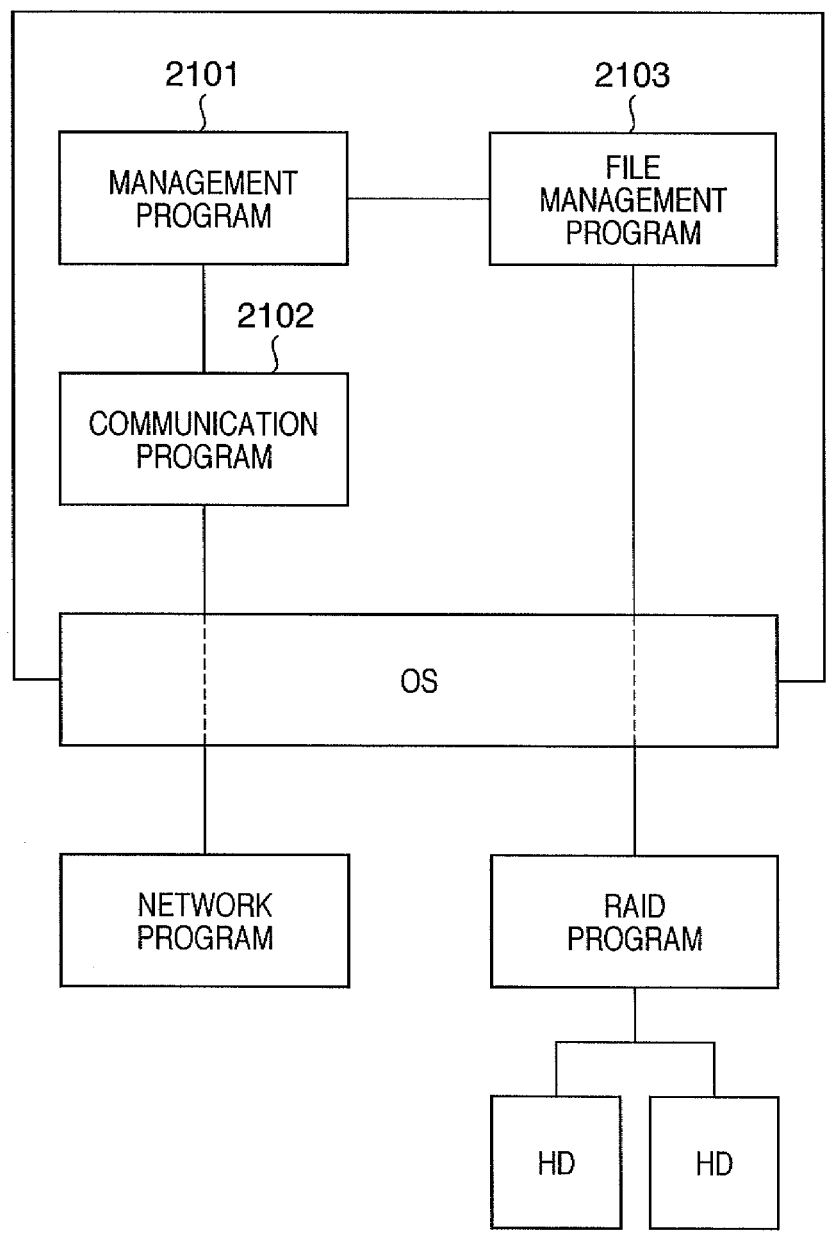
FIG. 4 is a block diagram showing the configuration of an access right control management program in the embodiment.

FIG. 4 is a block diagram showing the configuration of the access right control management program 2004. The access right control management program 2004 is implemented as part of the application 2003 in the server 102. In FIG. 4, a management program 2101 is the main part of the access right control management program 2004, and controls the overall program. By using the network control program 2006, a communication program 2102 performs communication between the server 102, and a peripheral device and the client PC 108. The communication program 2102 receives an ACT acquisition request from the client PC 108, and verifies the validity of an ACT from the printing apparatus 107. A file management program 2103 implements information management of the ACL and the like (to be described later) by using the HD control program 2007.

Figure 5:
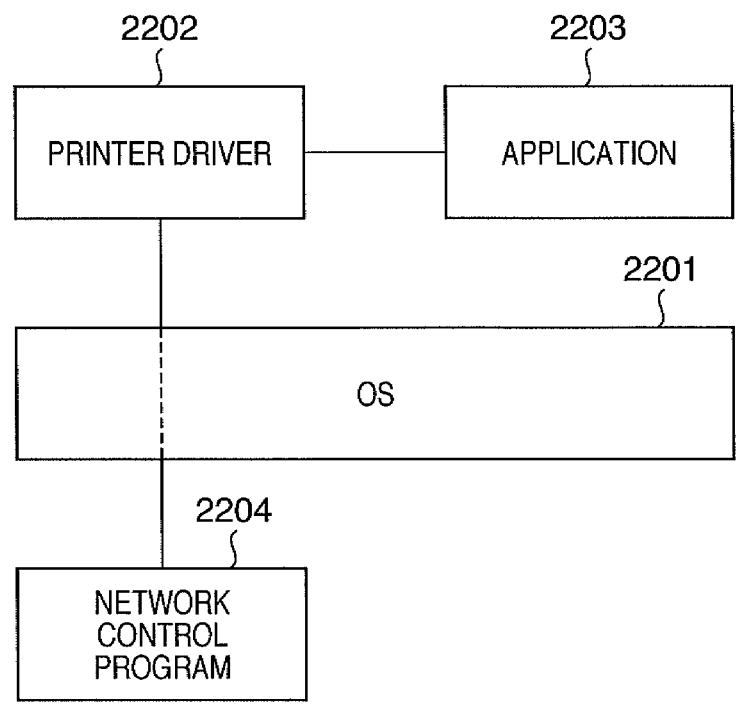
FIG. 5 is a block diagram showing the software module configuration of a client PC in the embodiment.

FIG. 5 is a block diagram showing the software module configuration of the client PC 108. In FIG. 5, an OS 2201 performs general processing of the client PC 108. A printer driver 2202 starts up in response to a print instruction from an application 2203. Via a network control program 2204, the printer driver 2202 acquires an ACT in executing printing, and transmits a print job together with an ACT to the printing apparatus 107. The timing when a requesting apparatus requests acquisition of an ACT is not limited to the timing to execute a job. For example, the ACT may also be acquired in advance by issuing an ACT acquisition request before executing a job. When an ACT is acquired before executing a job, determination based on the description of the ACT acquired in advance is performed in S1302 (to be described later).

A characteristic module configuration according to the first embodiment in the server 102 which performs access control will be explained with reference to FIG. 6.

Figure 6:
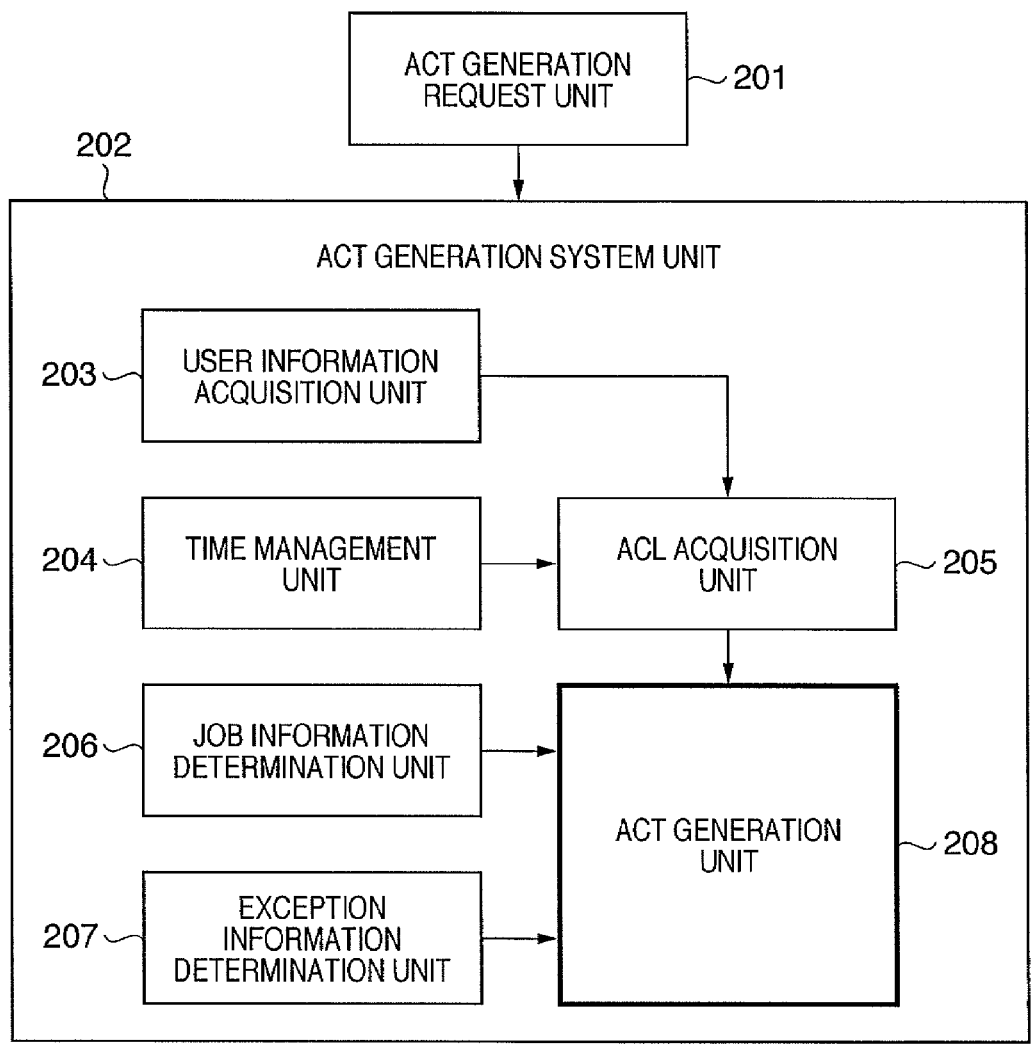
FIG. 6 is a block diagram showing the main hardware modules of devices in the embodiment.

Modules shown in FIG. 6 are installed by an installation program into the HD 1910 shown in FIG. 2, that is, external storage device. When activating a system installed in the server 102, these modules are read out from the HD 1910, loaded into a RAM on the CPU board 1903, and executed by the CPU, as needed.

Figure 7:
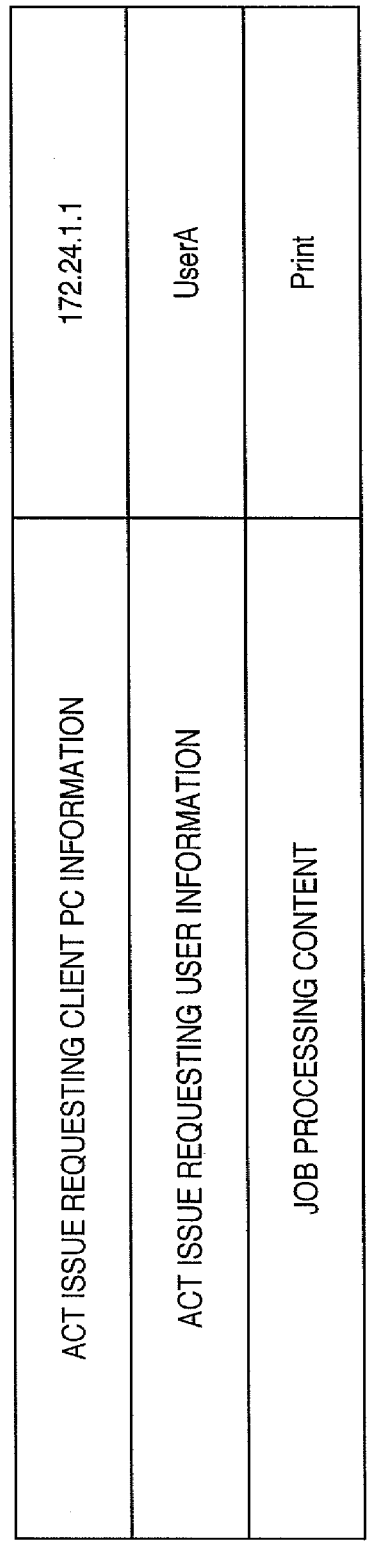
FIG. 7 is a table showing an example of information of an ACT issue request in the embodiment.

An ACT generation request unit 201 is a module which receives or acquires the ACT issue request 101 from the client PC 108 requiring an ACT, and transfers the information to an ACT generation system unit 202. FIG. 7 shows an example of request information in the ACT issue request 101 issued from the client PC 108 when executing printing. In FIG. 7, the request information contains IP address information for identifying a PC which has issued the ACT issue request 101, information on a user who is to print, and information representing that the processing content is "print".

The ACT generation system unit 202 receives request information of the ACT issue request 101 acquired by the ACT generation request unit 201, and issues an ACT to the requesting client PC 108.

In the ACT generation system unit 202, a user information acquisition unit 203 acquires information on a user who has requested ACT issue. In this case, the user information acquisition unit 203 extracts a user name "UserA" shown in FIG. 7, refers to user information managed in an active directory (to be referred to as AD hereinafter) based on the user name, and acquires information on the type of occupation of the user who has issued the ACT issue request 101, an authentic group to which the user belongs, and the like. The acquired user information is transferred to an ACL acquisition unit 205, and used for subsequent processing. The user in the first embodiment means an individual user, department, and the like so as to identify a job requesting source when the server 102 manages a job.

A time management unit 204 identifies the time or time period during which the ACT issue request 101 has been issued, and transfers the information to the ACL acquisition unit 205. A job information determination unit 206 determines print job information from the client PC 108. If special processing needs to be performed when outputting a print job, the job information determination unit 206 transfers the information to an ACT generation unit 208. When a print job requested by the client PC 108 needs to be forcibly executed, an exception information determination unit 207 transfers the information as exception information to the ACT generation unit 208. That is, when an ACT needs to be issued even exceptionally to continue printing for a requested print job, the exception information determination unit 207 transfers the information as exception information to the ACT generation unit 208.

The ACT generation unit 208 generates an ACT to be replied to the client PC 108 which has issued the ACT issue request 101.

ACT Generation Processing

Figure 8:
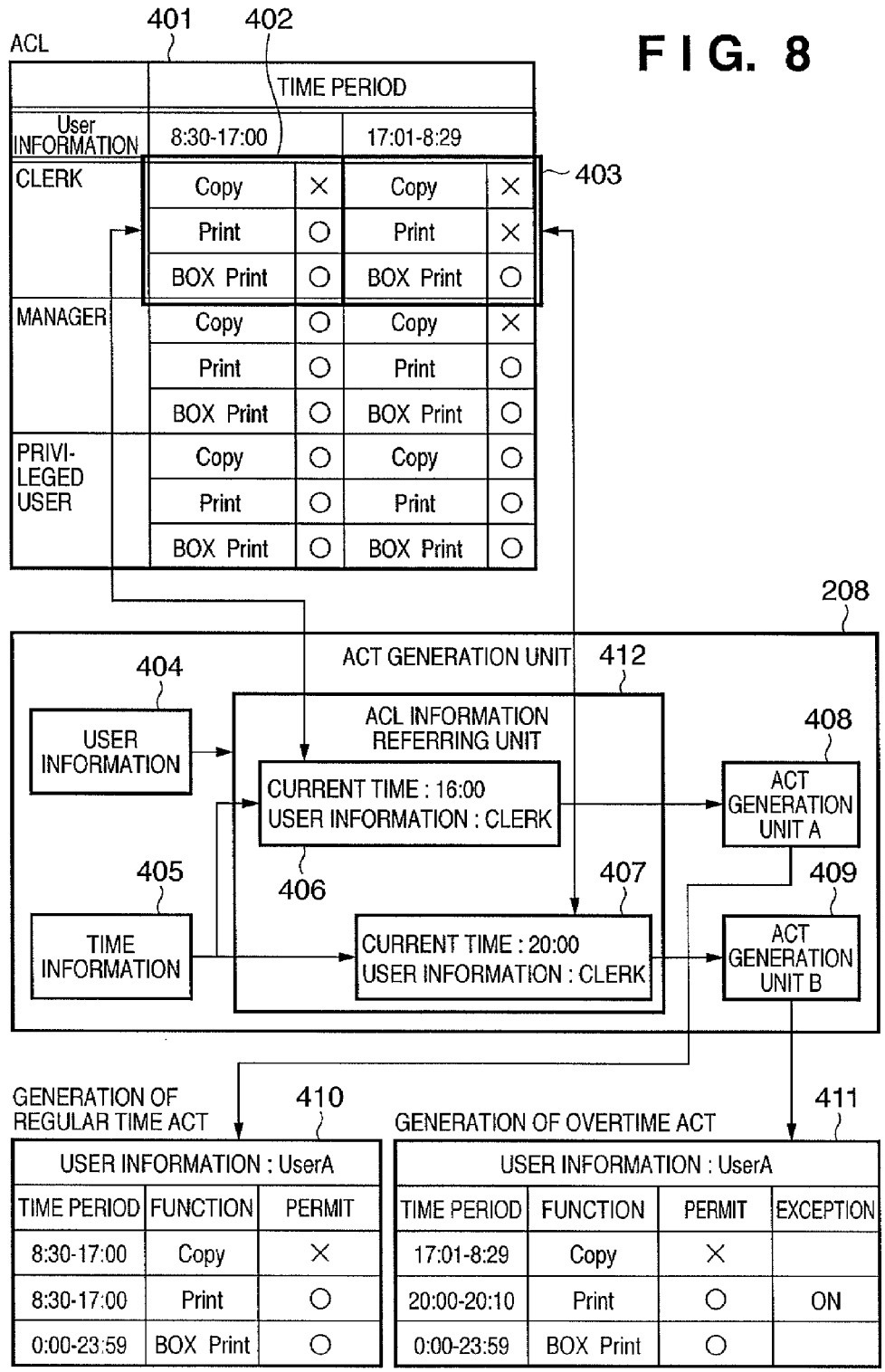
FIG. 8 is a view showing an outline of ACT generation processing by an ACT generation unit in the embodiment.

ACT generation processing by the ACT generation unit 208 will be described in detail with reference to FIG. 8. In FIG. 8, an ACL 401 is a simple example of the ACL 103 shown in FIG. 1. The ACL 401 is implemented as an information table whose information is stored in an external storage device or database in the server 102. The ACL acquisition unit 205 shown in FIG. 6 can refer to the ACL 401, as needed. The ACL 401 describes, for each user, printing apparatus functions which are permitted and restricted (inhibited) in accordance with the time period.

As shown in FIG. 8, the ACL 401 records user information, time period information, and function restriction information for each time period. The ACL 401 will be described using the simplest example. In the ACL 401, user information is roughly classified into a clerk, manager, or privileged user. The ACL 401 describes restriction information for each printing apparatus function available by each user. The present invention is not limited to the user information classification in FIG. 8 as long as user information can be used to specify restriction of each function in job execution. The user information can be obtained by referring to the AD or the like based on information on a user who has issued a print request, identifying the user classification, and accessing table information at a portion where pieces of user information meet each other. In this example, the time period is divided into two for descriptive convenience, but finer time periods can also be set. Also in this example, pieces of user information are classified into the three groups, but finer user groups can also be defined.

In the ACL 401, table information 402 represents printing apparatus function restriction in a time period "8:30-17:00" when user information is classified into "clerk". Similarly, table information 403 represents printing apparatus function restriction in a time period "17:01-8:29" when user information is classified into "clerk". In other words, the table information 402 is an ACL table for the regular time, and the table information 403 is an ACL table for the overtime. The first embodiment will describe time periods using the terms "regular time" and "overtime", but time periods may also be called, for example, the first and second time periods as long as the information can identify the time period.

In the ACT generation unit 208, an ACL information referring unit 412 receives, via the ACL acquisition unit 205, user information 404 and ACT request time information 405 that are acquired by the user information acquisition unit 203 and time management unit 204. Reference numerals 406 and 407 denote examples of the input information. The input information 406 and input information 407 exhibit different time periods during which ACT requests are issued. More specifically, the input information 406 represents an example in which the ACT request time is 16:00 and the requesting user has the right of a clerk. The input information 407 represents an example in which the ACT request time is 20:00 and the requesting user has the right of a clerk. The ACL information referring unit 412 acquires printing apparatus function restriction information by looking up the ACL table 402 for the input information 406 and the ACL table 403 for the input information 407 in accordance with the time period during which an ACT request was issued.

For each time period, the ACT generation unit 208 has a logical configuration for actually generating an ACT. More specifically, an ACT generation unit A 408 corresponds to the regular time period "8:30-17:00", and generates a regular time ACT. An ACT generation unit B 409 corresponds to the overtime period "1:01-8:29", and generates an overtime ACT.

As described above, in accordance with the ACT request time information 405, the ACT generation unit 208 determines an ACL to be referred and an ACT generation unit to be activated. More specifically, for the input information 406 corresponding to the regular time, the ACT generation unit A 408 generates a regular time ACT 410 by looking up the ACL table 402. For the input information 407 corresponding to the overtime, the ACT generation unit B 409 generates an overtime ACT 411 by looking up the ACL table 403. The regular time ACT 410 and overtime ACT 411 describe printing apparatus functions which are permitted and restricted (inhibited) in accordance with the time period for a user who has requested an ACT.

The regular time ACT 410 shown in FIG. 8 is the simplest example of an ACT generated in the regular time period. The regular time ACT 410 holds user information for identifying a user, the time period, functions, and information on permission/inhibition of the functions. Although not shown, the overtime ACT 411 has an area for storing an exception flag representing that when a given function of the printing apparatus is exceptionally permitted, permission information of the function is exceptional, and an area for storing a print job ID for identifying an exceptional print job. "Exceptional" means that execution of a job using a function originally inhibited in a given time period in the ACL table shown in FIG. 8 is permitted under a condition that, for example, a job execution log as shown in FIG. 19 is recorded.

ACT generation processing by the ACT generation unit 208 will be explained in detail with reference to FIGS. 9 and 10.

In S901, the ACT generation request unit 201 accepts the ACT issue request 101 issued from the client PC 108 which is to print, and transfers the request to the ACT generation system unit 202.

In S902, the ACT generation system unit 202 causes the user information acquisition unit 203 to acquire information on a user who has issued the ACT issue request 101. The acquired user information is user classification information which is obtained by referring to the AD based on the user name, and includes the type of occupation of the user and the like necessary when accessing the ACL.

In S903, information on a print job is acquired. FIG. 11 shows an example of the acquired print job information. In FIG. 11, the print job information includes information on a user who is to print, a job ID for identifying a print job, priority information in printing, a print job name for identifying the name of a document to be printed, and a print request time for identifying a printout time. The print job information shown in FIG. 11 is merely an example, and another detailed information can also be held.

In S904, the user information is embedded in the regular time ACT 410 and overtime ACT 411 shown in FIG. 8.

In S905, the time management unit 204 acquires information on the issue time (current time) of the ACT issue request 101. The acquired time information may be the time when the server 102 has received an ACT request, or the time when the client PC 108 has substantially issued an ACT request. The acquired time information is used to confirm whether the ACT issue request 101 (or job execution request) has been issued within the regular time, which will be described later.

In S906, it is determined whether the time information acquired in S905 represents the regular time or overtime. Based on the result of determination in S906, it is determined which of the regular time ACL table 402 and overtime ACL table 403 is to be looked up. If it is determined in S906 that the time information represents the regular time, the process proceeds to S907. If it is determined in S906 that the time information represents the overtime, the process proceeds to S908.

Figure 10:
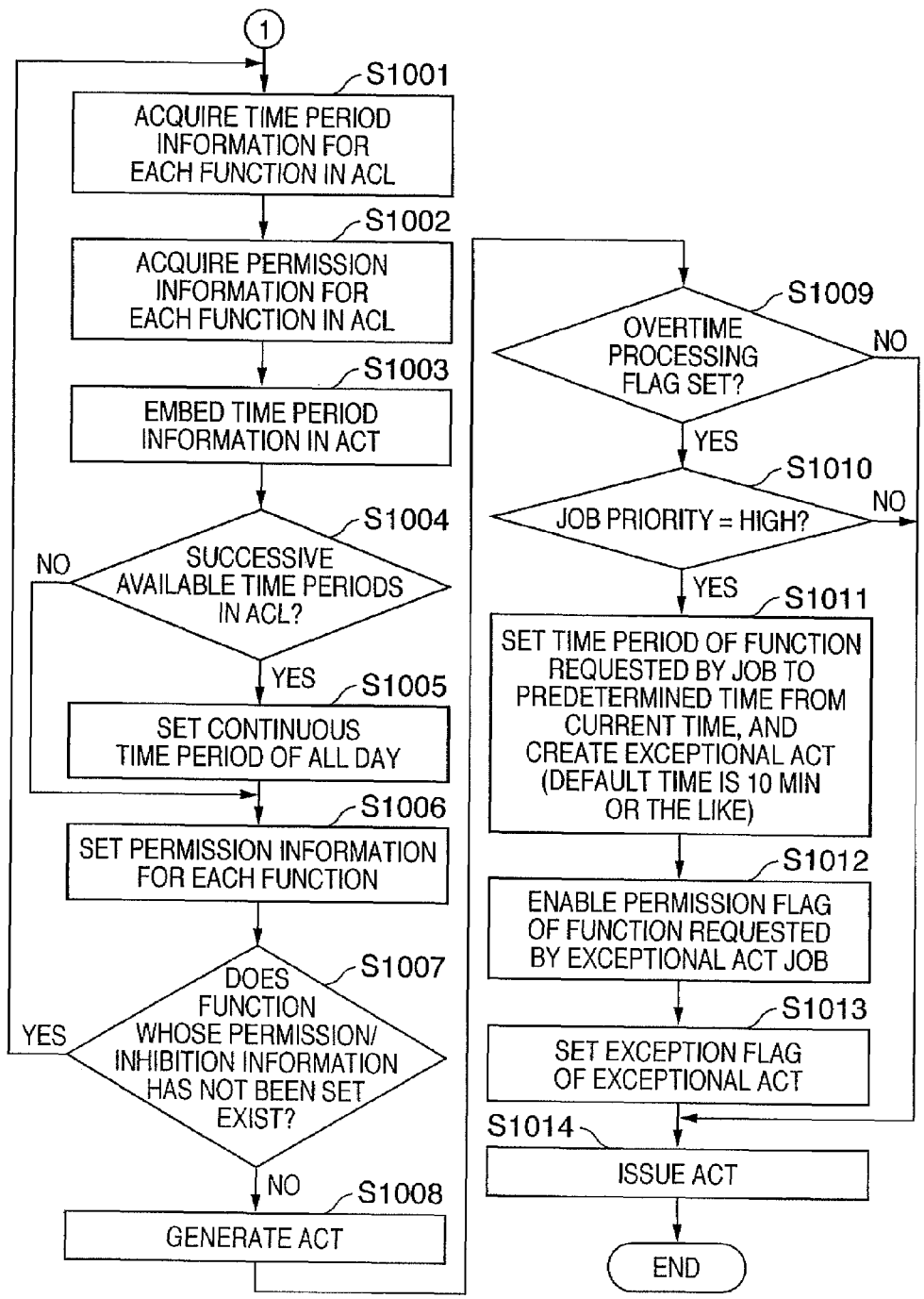
FIG. 10 is a flowchart showing ACT generation processing in the embodiment.

In S907, ACL information is acquired by looking up the regular time ACL table 402, and the process proceeds to S1001 in FIG. 10. By the process in S907 and a process in S912 to be described later, an ACL for generating an access control ticket based on the time period can be referred to upon receiving the request in S901.

In S908, whether the output priority of the print job is high is determined from the print job information acquired in S903. If it is determined that the output priority is high, the process proceeds to S909; if it is determined that the output priority is low, to S912.

The user can set high priority for a print job via the setup window of the printer driver. High priority can be set for each job. When high priority is set, it is set in the print job information determined in S903 that the priority is high.

In S909, information on a user who exceptionally requests printing because of high job priority though the time period is the overtime is acquired from the print job information shown in FIG. 11, and an exceptional output table is updated based on the user information. The exceptional output table is held in the server 102 and defines the exceptional output count in order to deter a user who repeats exceptional printing.

FIG. 12 shows an example of the exceptional output table. The exceptional output table is used to manage the upper limit of exceptional outputs for each user. The exceptional output table manages a specified count up to which exceptional outputs are permitted for each user, and an actual count at which exceptional outputs have been done. In the exceptional output table, the specified count can be set for each user right. When the actual exceptional output count reaches the upper limit, subsequent exceptional outputs are inhibited. However, it is also possible to manage the upper limit of exceptional outputs for each month by, for example, clearing the actual exceptional output count at the beginning of the next month.

In S910, it is determined by looking up in the exceptional output table shown in FIG. 12 whether exceptional outputs have reached the specified count. If it is determined that exceptional outputs have exceeded the specified count, the process proceeds to S911 to output a warning to the user who has issued an exceptional output request. As the contents of the warning processing, for example, warning mail may be sent to the user, who has issued an exceptional output request, based on information acquired from the AD, or notification mail may be sent to the chief of an organization to which the user belongs. At this time, the process can also be interrupted in accordance with a response to the warning from the user. The actual exceptional output count in the exceptional output table shown in FIG. 12 can be updated for each user by acquiring, by the server 102 via the network, an exceptional printing log (corresponding to FIG. 19) saved in each printing apparatus, and reflecting the exceptional printing log.

If it is determined in S910 that exceptional outputs do not exceed the specified count, or after the end of the warning processing in S911, the process proceeds to S912.

In S912, each information is acquired by looking up the overtime ACL table 403 regardless of whether the job priority is high or low.

In S913, a flag is set to represent that the process step in overtime printing has been executed. Then, the process proceeds to S1001 in FIG. 10. The flag set in S913 is used to determine whether exceptional processing is designated in each subsequent step.

The flowchart shown in FIG. 10 will be explained. Upon acquiring ACL information, time period information is acquired for each function in the ACL in S1001. For example, when the ACL table 402 is looked up, information representing that the function "Copy" is managed in the time period "8:30-17:00" is acquired. In S1002, permission information is acquired for each function in the ACL. For example, when the ACL table 402 is looked up, information representing that the function "Copy" is inhibited is acquired. In S1003, time period information (in this case, "8:30-17:00") is embedded in the regular time ACT 410. When the overtime ACL table 403 is looked up in S1001 and S1002, time period information is embedded in the overtime ACT 411 in S1003.

In S1004, not the looked-up ACL table but the other ACL table is looked up to determine whether the available time periods of the target function are successive. More specifically, by looking up the ACL table 403 in addition to the looked-up ACL table 402, it is determined that permission time periods are not successive for the function "Print", and are successive for the function "BOX Print". If permission time periods are successive for each function, the process proceeds to S1005 to change the available time periods of each function to the time period of all day, as represented by time period information of the function "BOX Print" in the regular time ACT 410. After that, the process proceeds to S1006. Note that the function "BOX Print" is to save print data received from the client PC 108 or document image data input from the document reader of the printing apparatus 107 in the nonvolatile storage device (e.g., HDD) of the printing apparatus 107. The user can designate, from the client PC 108, operation panel, or the like, printing of data saved in the nonvolatile storage device of the printing apparatus 107.

If it is determined in S1004 that the permission time periods of each function are not successive, the process proceeds to S1006.

In S1006, the permission/inhibition information acquired in S1001 and S1002 is set in the regular time ACT 410 or overtime ACT 411. In S1007, it is determined whether permission/inhibition information has been set for all functions which should be described in the regular time ACT 410 or overtime ACT 411. If a function whose permission/inhibition information has not been set exists, the process returns to S1001 to repeat the above-described process. After the end of setting permission/inhibition information for all functions, the process proceeds to S1008.

In S1008, an ACT to be sent back to the client PC 108 is generated on the basis of the setting of permission/inhibition information for each function in correspondence with the time periods set by the above-described series of processes.

In S1009, it is determined whether the flag has been set in step S913. If it is determined that the ACT is to be issued during the overtime, the process proceeds to S1010. If it is determined that the ACT is to be issued during the regular time, the process proceeds to S1014 to issue the ACT.

In S1010, it is determined from the print job information acquired in S903 whether the output priority of the print job is high. If it is determined that the output priority is high, the process proceeds to S1011; if it is determined that the output priority is low, to S1014.

In S1011, an ACT which exceptionally permits an image processing apparatus function originally restricted based the time period is generated. The exceptional permission ACT allows the user to use a desired printing apparatus function in an arbitrary time period.

Also in S1011, the printable time period is set to a predetermined time (default time is, e.g., 10 min) from the current time in order to allow executing a print job within a predetermined time to perform exceptional output on the basis of high priority. In the overtime ACT 411 shown in FIG. 8, the function "Print" is permitted only within "20:00-20:10".

Although not shown in FIG. 8, a print job ID is set in the "print job ID" area of the overtime ACT 411 in order to identify a print job.

In S1012, permission/inhibition information of the function "Print" in the overtime ACT 411 is set to "permit (○)" in order to perform exceptional printing. In S1013, the exception flag is set (ON) for the function "Print" in the overtime ACT 411 to represent that the permission information is exceptional.

In S1014, the regular time ACT 410 or overtime ACT 411 created by the above-described series of processes is replied to the apparatus which has requested the ACT issue, that is, the requesting apparatus. The network address of the requesting apparatus and the like can be identified based on the address contained in the request information of FIG. 7 acquired in S1001.

Figure 9:
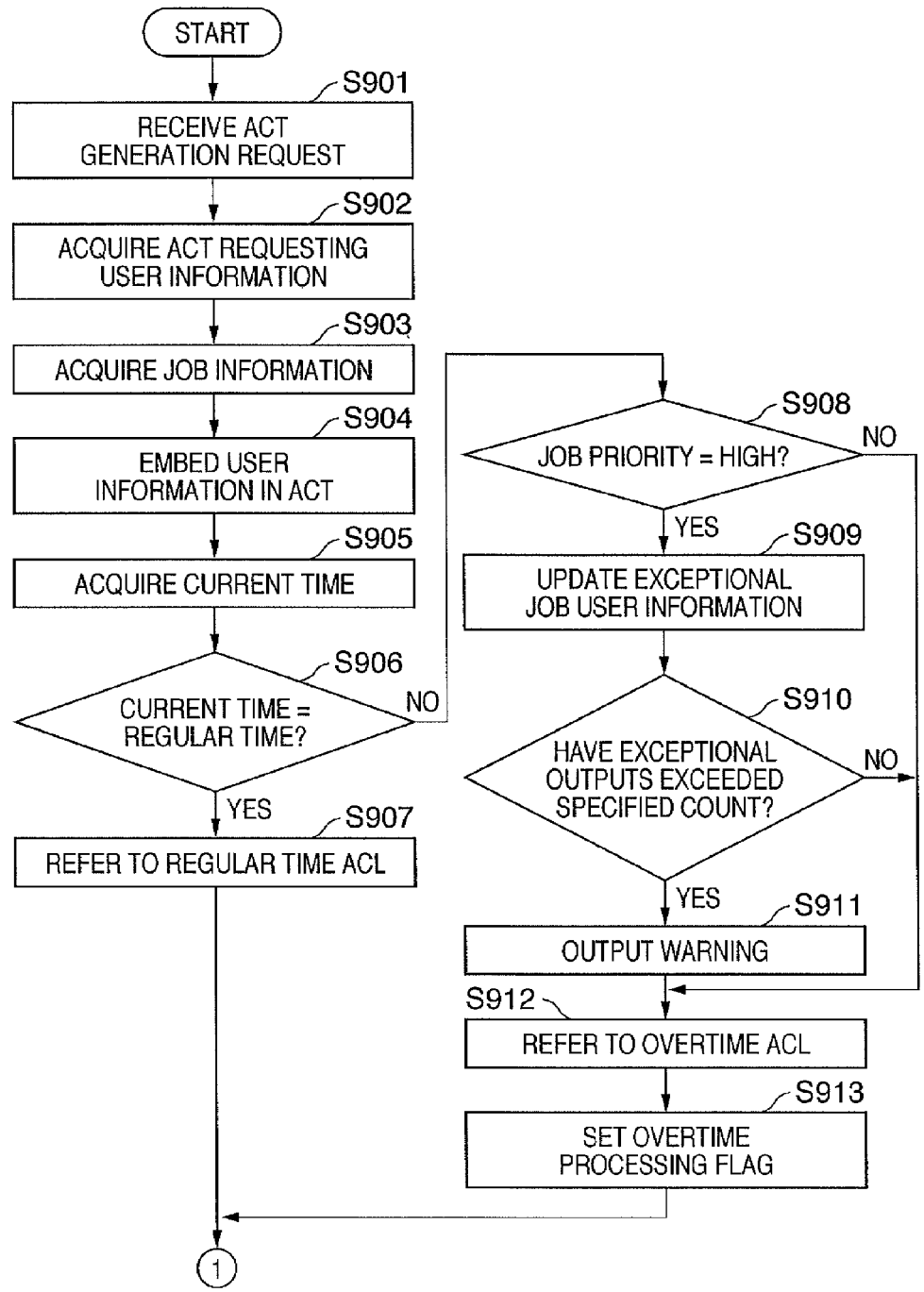
FIG. 9 is a flowchart showing ACT generation processing in the embodiment.

Upon receiving the ACT issue 105 obtained in accordance with the flowcharts shown in FIGS. 9 and 10, the client PC 108 transmits the print job 106 together with the received ACT to the printing apparatus 107, as shown in FIG. 1. The ACT based on the ACT issue 105 and the print job can be associated by archiving the ACT together with the print job or embedding the ACT in the print job. It is also possible to embed a print job ID in the ACT and associate the ACT and print job using the print job ID as a key.

Upon receiving the ACT issued based on the flowcharts shown in FIGS. 9 and 10, the ACT requesting apparatus compares function restriction information contained in the received ACT with a printing apparatus function designated by the print job. If the print job designates a function inhibited in the ACT as a result of comparison, job execution inhibition processing is done. The inhibition processing can include forced job cancellation, or display of a warning that the job cannot be executed with designated settings.

As described above, according to the flowcharts shown in FIGS. 9 and 10, the server which controls permission/inhibition of the use of the printing apparatus for each user can add function restriction information based on the time period as a component of an ACT to be issued to the user. By generating an ACT in which the function restriction changes depending on the time period, each function of the printing apparatus can be restricted based on the time period.

Permission/inhibition of printing can be controlled based on the time even for a user permitted to print. Further, finer control can be achieved such that a function which should be available all day is permitted.

Print Job Input Processing

Figure 13B:
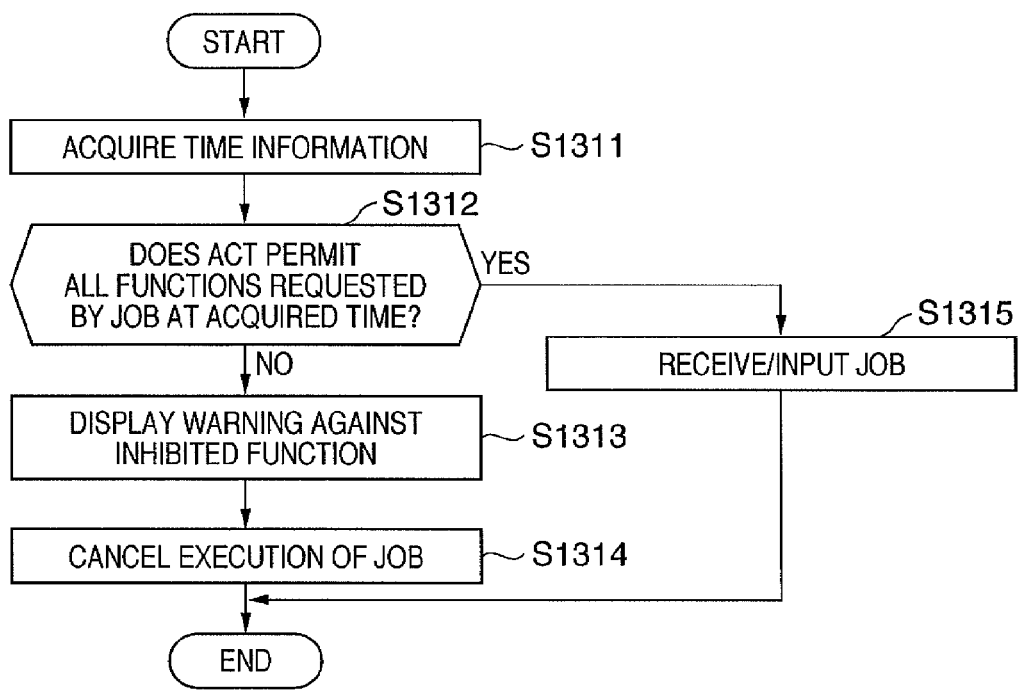
FIG. 13B is a flowchart showing job processing by a printing apparatus in the embodiment.

Processing until an ACT is acquired from the server 102 in response to ACT issue in S1014 and a print job is input to the printing apparatus will be described with reference to FIGS. 13A and 13B. FIG. 13A is a flowchart showing processing by the client PC 108 which has acquired an ACT issued from the server 102 in S1014. FIG. 13B is a flowchart showing processing by the printing apparatus 107 upon receiving an ACT from the client PC 108 or server 102.

The flowchart shown in FIG. 13A will be explained.

In S1301, the client PC 108 acquires current time information. For example, the client PC 108 acquires current time information held by the OS on which the printer driver runs. In S1302, the client PC 108 determines whether the ACT permits all functions requested by a job at the acquired time. For example, if the current time is 20:00, the overtime ACT 411 is acquired from the server 102, and the function requested by the job is Copy, the client PC 108 determines NO in S1302. If the current time is 20:00, the overtime ACT 411 is acquired from the server 102, and the function requested by the job is Print, the client PC 108 determines YES in S1302.

If NO in S1302, the client PC 108 displays a warning against an inhibited function on the display unit of the client PC 108 in S1303 to notify the user that a job function requested by any ACT is inhibited.

In S1304, execution of the job is canceled, and the process ends.

If YES in S1302, the client PC 108 transmits a print job to the printing apparatus 107 together with the acquired ACT in S1305.

In S1303 and S1304, when an ACT replied from the server 102 inhibits an image processing apparatus function designated in a print job, display of a warning and cancellation of job execution are done as inhibition processing. However, the present invention is not limited to this example. For example, it is also possible to only display a warning in S1303 without canceling a job in S1304. In this case, an inhibited function may also be canceled in the printing apparatus or the setting may also be changed (from color printing to monochrome printing).

The flowchart shown in FIG. 13B will be explained. As described above, FIG. 13B shows processing by the printing apparatus 107 upon receiving an ACT from the client PC 108 or server 102.

In S1311 to S1314, the printing apparatus 107 performs the same processes as those in S1301 to S1304 for an ACT received from the client PC 108 or server 102. In S1315, when the printing apparatus 107 has received the ACT from the client PC 108, it receives a print job transmitted together with the ACT. When the printing apparatus 107 has received the ACT from the server 102, document image data scanned by the scanner of the printing apparatus 107 is input into the printing apparatus 107.

In S1313 and S1314, similar to S1303 and S1304 described above, only a warning may also be displayed as job execution inhibition processing.

As described above, according to the first embodiment, execution of a job using the functions of the image processing apparatus (printing apparatus) can be finely, flexibly restricted as compared with a conventional mechanism. For example, execution of a copy job during the overtime can be inhibited for a user having the clerk right and permitted for only a user having a predetermined right. This can prevent a situation in which, for example, a copy of confidential information is carried out at night.

Instead of uniformly inhibiting execution of a job during the overtime for a user having the clerk right, permission/inhibition of job execution can be set for each function of the printing apparatus. For example, only box print can be permitted during the overtime, improving user friendliness of the printing apparatus.

An exceptional access control thicket can be issued by designating a job with high priority by the user via a setup window. This can prevent a situation in which a business operation urgently arising during the overtime is hindered. The exceptional access control thicket allows the printing apparatus to execute a job function inhibited during the overtime. Since the server 102 manages the log of the job function, it can be suppressed to frequently issue exceptional access control thickets.

<Second Embodiment>

The second embodiment according to the present invention will be described. The system configuration in the second embodiment is almost the same as that in the above-described first embodiment, and a description of the same part will not be repeated. In the second embodiment, an exceptional ACT is used when the print request time and print job execution time are different, like a timer job which designates job execution time information.

Outline of Print Processing

Figure 14:
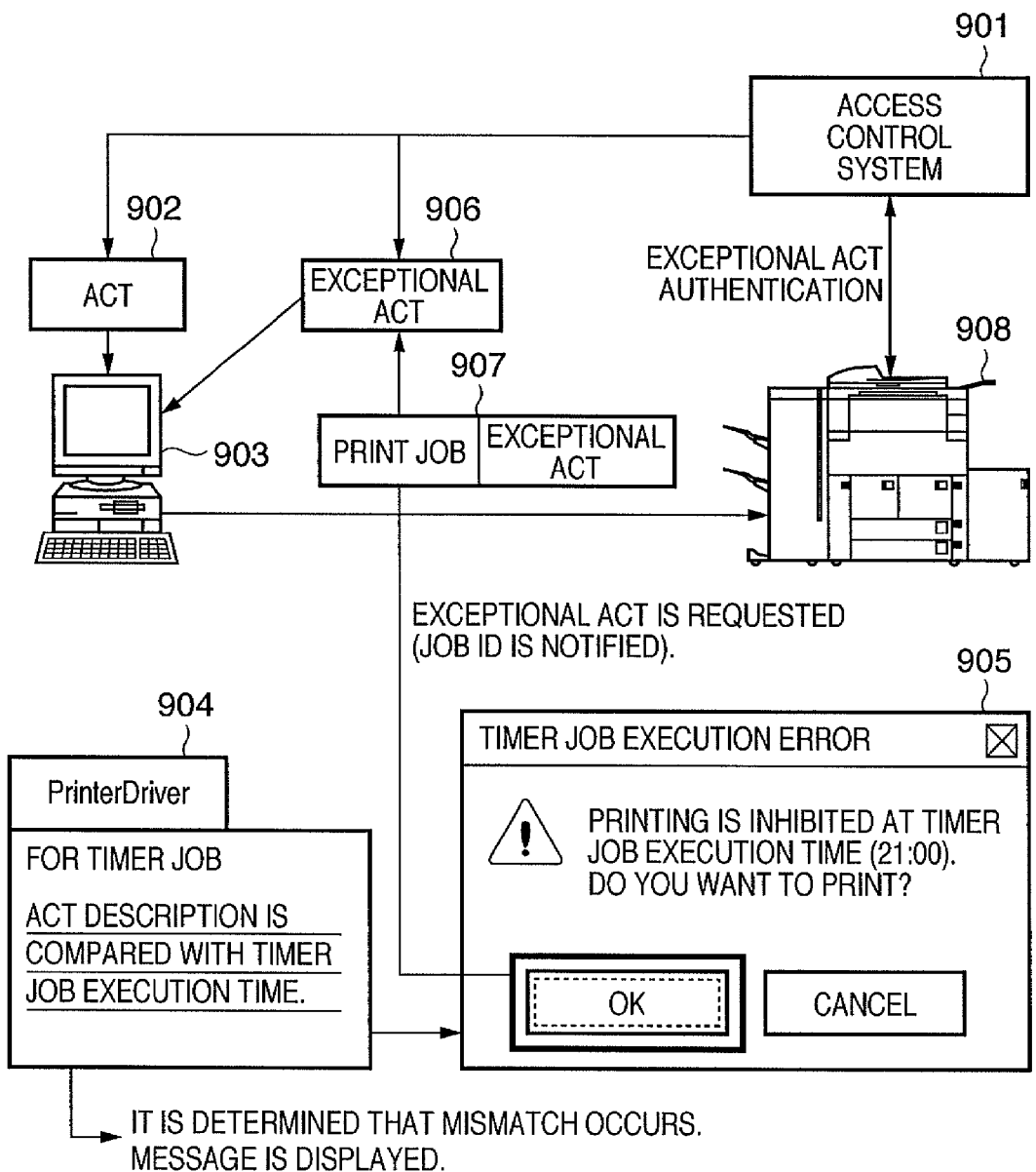
FIG. 14 is a view showing an outline of print processing when the print request time and print job execution time are different in the second embodiment.

FIG. 14 is a view showing an outline of print processing when the print request time and print job execution time are different in the second embodiment. A system 901 is identical to the access control system 102 described in the first embodiment. An ACT 902 is issued from the system 901 when a client PC 903 issues a print request within the regular time. The ACT 902 holds the same information as the above-described regular time ACT 410 shown in FIG. 8. The ACT 902 has information on a user who is to print, and information on function restriction in printing. The print function (Print) is permitted during the time period of 8:30 to 17:00.

A printer driver 904 runs on the client PC 903, and can interpret information on a print job and information on an ACT acquired in printing. The printer driver 904 determines whether the target job is a timer job (print job which prints by designating the output time) or a normal print job. If the target job is a timer job, the printer driver 904 compares the timer job execution designation time with the print permission time period in the ACT. If a mismatch is detected, the printer driver 904 displays a message 905 to notify the user of this effect. The message 905 further prompts the user to determine whether to continue printing though the execution time does not match the print permission time period. If the user designates continuation of printing, the client PC 903 requests an exceptional ACT 906 of the access control system 901.

Upon receiving the exceptional ACT 906, the client PC 903 transmits it to a target printing apparatus 908 together with a print job 907, thereby printing. The printing apparatus 908 holds, as exceptional printing, the log of the print job 907 received together with the exceptional ACT 906. By referring to this log, a print job which executed exceptional printing can be identified.

Print Request

Print request processing shown in FIG. 14 in the second embodiment will be explained in detail with reference to FIG. 15.

In S1101, when the client PC 903 issues a print processing request, the printer driver 904 running on the client PC 903 requests an ACT of the access control system 901. In response to the request in S1101, the access control system 901 executes the processes shown in the flowcharts of FIGS. 9 and 10 described in the first embodiment.

In S1102, the access control system 901 acquires the ACT 902 which corresponds to the current time period. A concrete example of the acquired ACT is the above-mentioned regular time ACT 410 shown in FIG. 8.

In S1103, it is determined whether the target print job is a timer job (job whose execution time is designated). FIG. 16 shows an example of job information of the timer job. The timer job information contains information on "print execution time" in addition to normal print job information shown in FIG. 11. Whether the target print job is a timer job can be determined based on the presence/absence of the print execution time information. If it is determined in S1103 that the target print job is not a timer job, the process proceeds to S1111. If it is determined that the target print job is a timer job, the process proceeds to S1104.

In S1104, information on the timer job execution time is acquired from the timer job information in FIG. 16. In S1105, information on the print permission time period included in the ACT 902 acquired in S1102 is acquired. In S1106, it is determined whether a mismatch occurs between the print permission time period included in the ACT 902 and the print execution time included in the timer job information. In the example shown in FIG. 14, the printable time period in the ACT 902 (regular time ACT 410) is 8:30 to 17:00, and the timer job execution time is 21:00. Hence, it is determined that a mismatch occurs. If a mismatch is detected, the process proceeds to S1107; if no mismatch is detected, to S1111.

Figure 17:
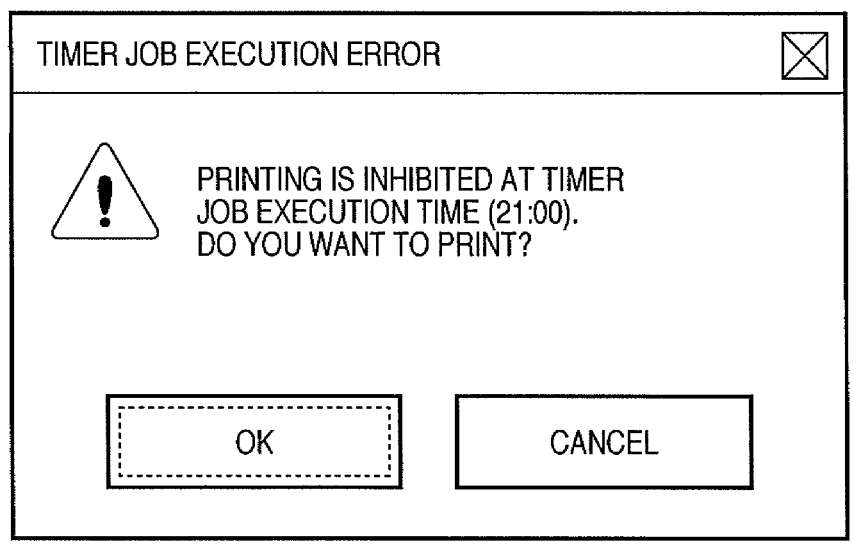
FIG. 17 is a view showing an example of a timer job continuation confirmation message in the second embodiment.

In S1107, a message as shown in FIG. 17 is displayed in accordance with detection of a mismatch, prompting the user to determine whether to continue print processing as exceptional printing. In S1108, whether to continue print processing as exceptional printing is determined based on a user input in response to the message. If print processing continues as exceptional printing, the process proceeds to S1109. If print processing does not continue, the print job is canceled, and the process ends.

In S1109, the client PC 903 requests the access control system 901 to automatically set high priority and issue the exceptional ACT 906 in order to perform exceptional printing (YES in S908). At this time, to identify a print job subjected to exceptional printing, the client PC 903 acquires a print job ID from the timer job information shown in FIG. 16, and requests issue of the exceptional ACT 906 based on user information, the job ID, and information representing exceptional printing. In response to the request for the exceptional ACT 906 in S1109, the access control system 901 executes the same processes as those in the flowcharts of FIGS. 9 and 10. However, if the access control system 901 accepts the request for the exceptional ACT 906 for a timer job in S1011 of FIG. 10 based on the processing shown in the flowchart of FIG. 15, it performs an operation different from that described in S1011. More specifically, the time period of a function (e.g., Print) requested by the job in S1011 is set to a predetermined time from the time when the timer job is to be executed, and the permission flag is set for the set time period in S1912.

In S1110, the client PC 903 acquires the exceptional ACT 906. A concrete example of the exceptional ACT 906 is the same as the overtime ACT 411 shown in FIG. 8. The exceptional ACT 906 has permission information representing that printing of a print job having a job ID "12345" is exceptionally permitted.

In S1111, the client PC 903 transmits the print job 907 to the printing apparatus 908 together with the acquired ACT 902 or exceptional ACT 906.

Job Execution Inhibition Processing Based on Acquired ACT

Figure 15:
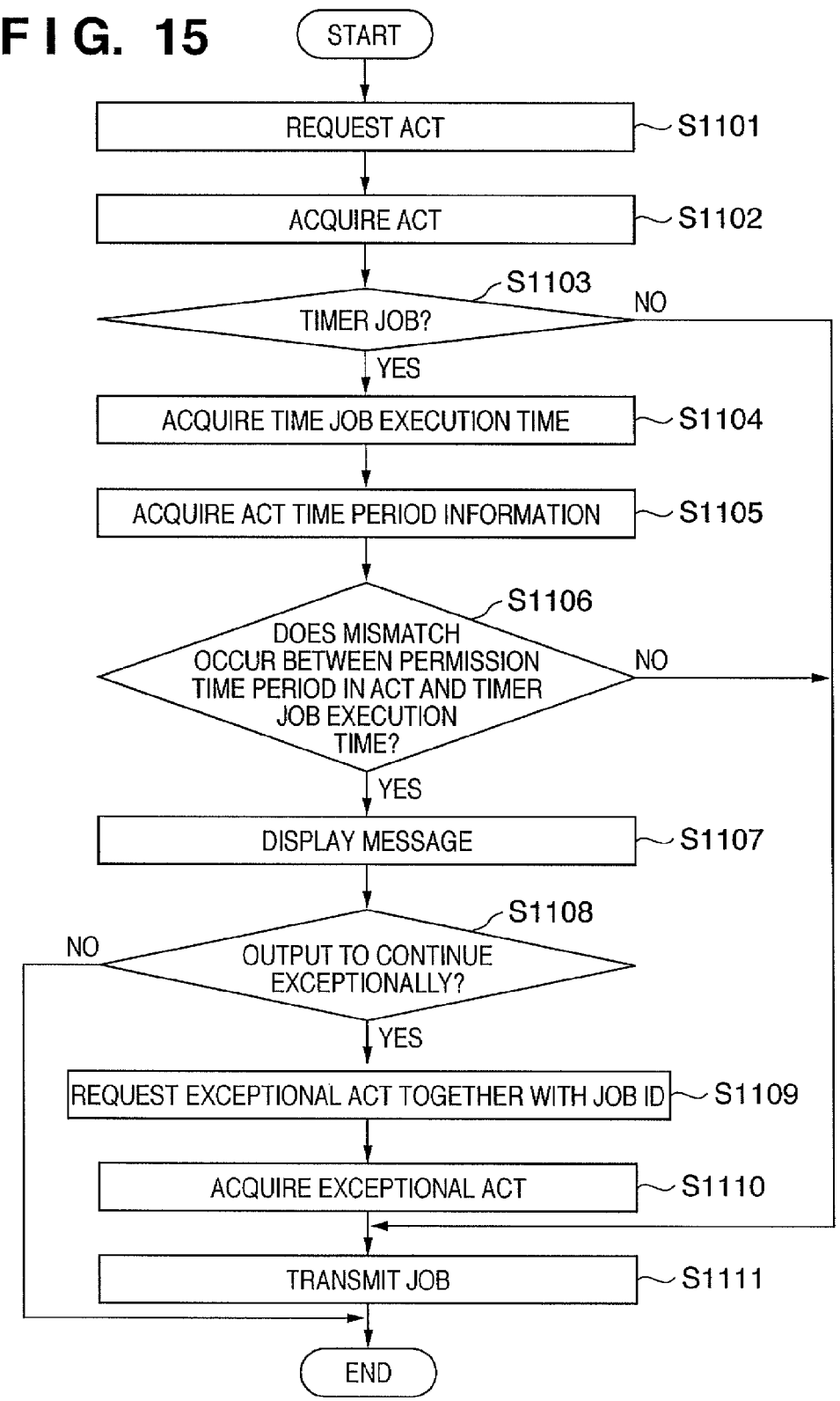
FIG. 15 is a flowchart showing print request processing based on a timer job in the second embodiment.

When the client PC 903 acquires the exceptional ACT 906 in S1110 of FIG. 15, it is actually determined whether to permit/inhibit execution of each function requested by the job in the ACT. In this case, both the client PC 903 and printing apparatus 908 execute the same processes as those described with reference to FIGS. 13A and 13B in the first embodiment.

In this case, however, S1301, S1302, S1311, and S1312 are slightly different from those in the first embodiment, and will be described in detail.

In S1301 and S1311 of the first embodiment, current time information upon receiving an ACT is acquired. When the received job is a timer job, like the second embodiment, the description of permission/inhibition of each function in a time period containing the job execution time designated by the timer job is checked.

Execution of Printing

Figure 18:
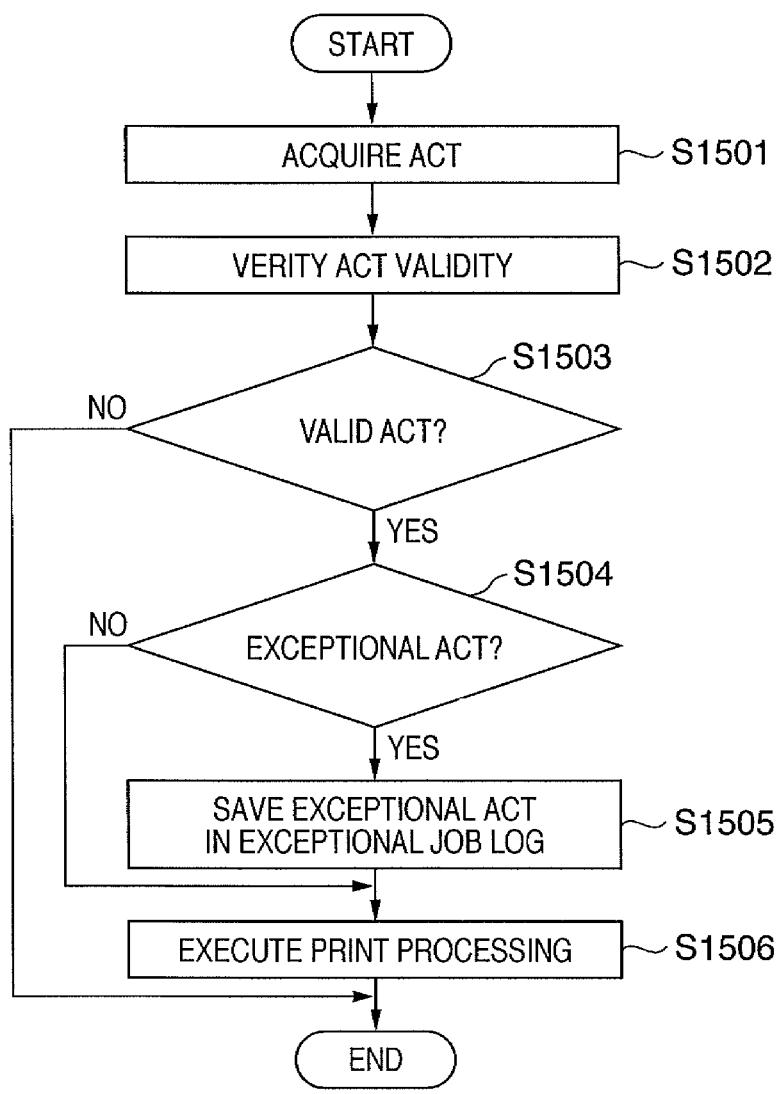
FIG. 18 is a flowchart showing exceptional printing log processing based on an exceptional ACT in the second embodiment.

Print processing by the printing apparatus 908 upon receiving the print job 907 having the ACT 902 or exceptional ACT 906 will be described in detail with reference to FIG. 18. Software modules which execute print processing in the printing apparatus 908 are stored in an internal HD 1922 of a printing apparatus 107 shown in FIG. 2, and if necessary, activated by controller software on a controller board 1915. When the printing apparatus has no HD unit but only, for example, the printer function, like the printer 110 shown in FIG. 2, these software modules are preinstalled in the ROM of a printer controller 1913 and executed as needed. In practice, the printing apparatus 908 executes the processing shown in FIG. 18 together with the above-described "Job Execution Inhibition Processing Based on Acquired ACT".

In S1501, the printing apparatus 908 acquires an ACT (ACT 902 or exceptional ACT 906) transmitted together with the print job 907. As described in the first embodiment, the ACT and print job can be associated with each other in various ways. In S1502, the printing apparatus 908 confirms the validity of the ACT. The validity of the ACT is confirmed by checking, for example, whether the ACT has been neither tampered nor expired. If the printing apparatus 908 determines in S1503 that the ACT is not valid, it cancels the print job, and the process ends. If the printing apparatus 908 determines that the ACT is valid, the process proceeds to S1504 to determine whether the ACT is the exceptional ACT 906. Whether the ACT is the exceptional ACT 906 is determined based on the exception flag set in the overtime ACT 411. If the ACT is the exceptional ACT 906, the printing apparatus 908 adds the exceptional ACT 906 as a log in S1505 to an information table which manages the log of exceptional printing. As management information of the exceptional printing log, user information, a print document name, printout time, and the like are held as shown in FIG. 19, and saved in a given format so that the printing apparatus 908 can acquire a list of management information. The access control system 901 acquires the exceptional printing log shown in FIG. 19 via the network, and can increment (update) the count in the exceptional output table shown in FIG. 12.

At the end of saving the exceptional printing log or if the ACT is not the exceptional ACT 906, the process proceeds to S1506 to execute print processing of the print job 907 received together with the ACT acquired in S1501. The print processing includes bitmapping of page description language data contained in the print job, and print processing by a printing means (print engine 1914 shown in FIG. 2) on a print medium such as paper based on the bitmap data.

As described above, according to the second embodiment, a time-designated job in which the print designation time and print execution time are different can be controlled by issuing an exceptional overtime ACT based on a timer job or the like. More specifically, the user can be warned in advance that a timer job will be canceled because the timer job issued by the user within the regular time is actually executed during the overtime, and a function not designated by the timer job is inhibited during the overtime.

<Third Embodiment>

The third embodiment according to the present invention will be described. The system configuration in the third embodiment is almost the same as that in the above-described first embodiment, and a description thereof will not be repeated. In the third embodiment, a server 102 transmits, to a client PC 108, an ACT describing permission/inhibition of the use of each printing apparatus function associated with job execution during each time period (including the regular time and overtime).

Figure 20:
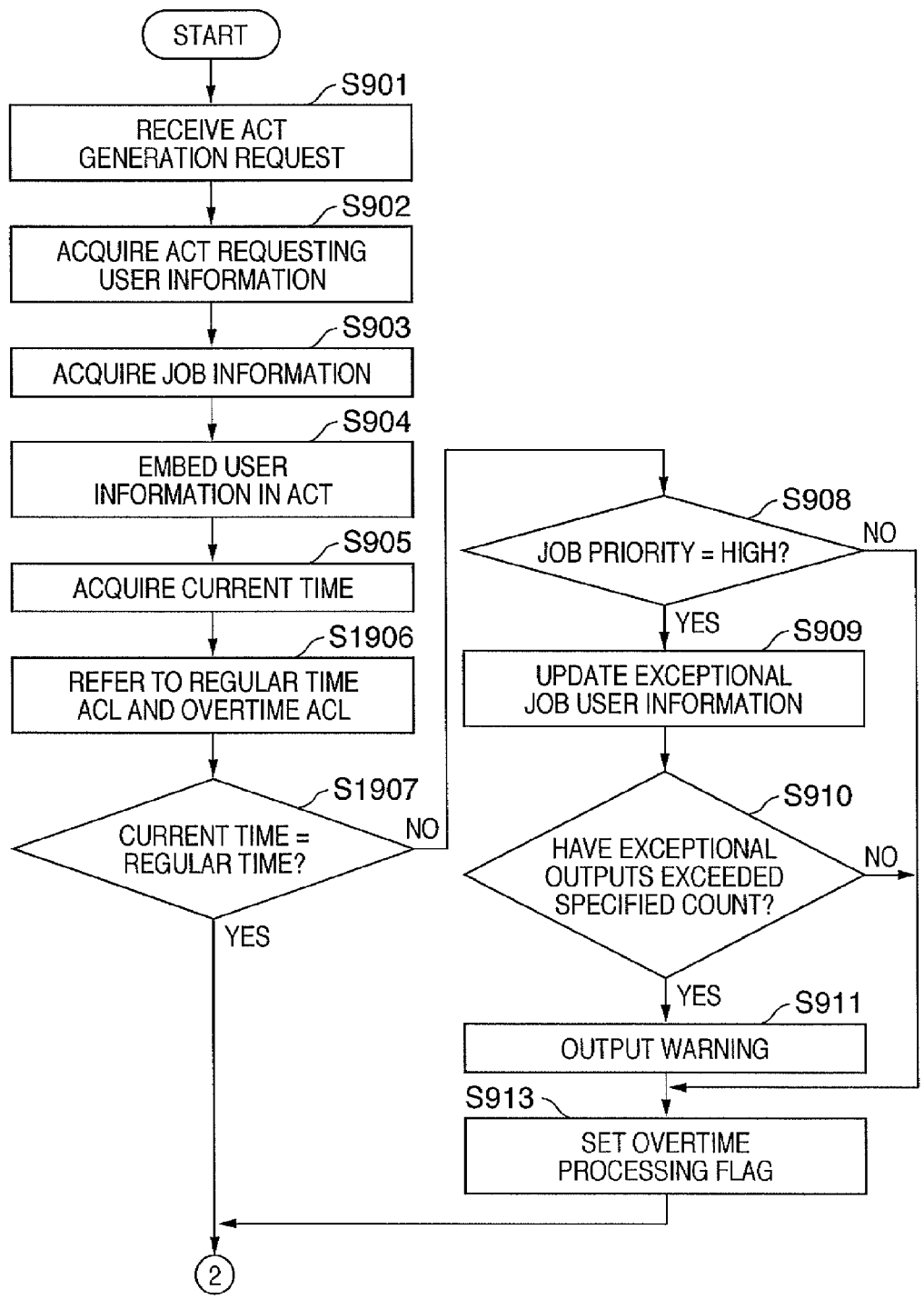
FIG. 20 is a flowchart showing processing for a print request which exceeds the permission time in the third embodiment.
Figure 21:
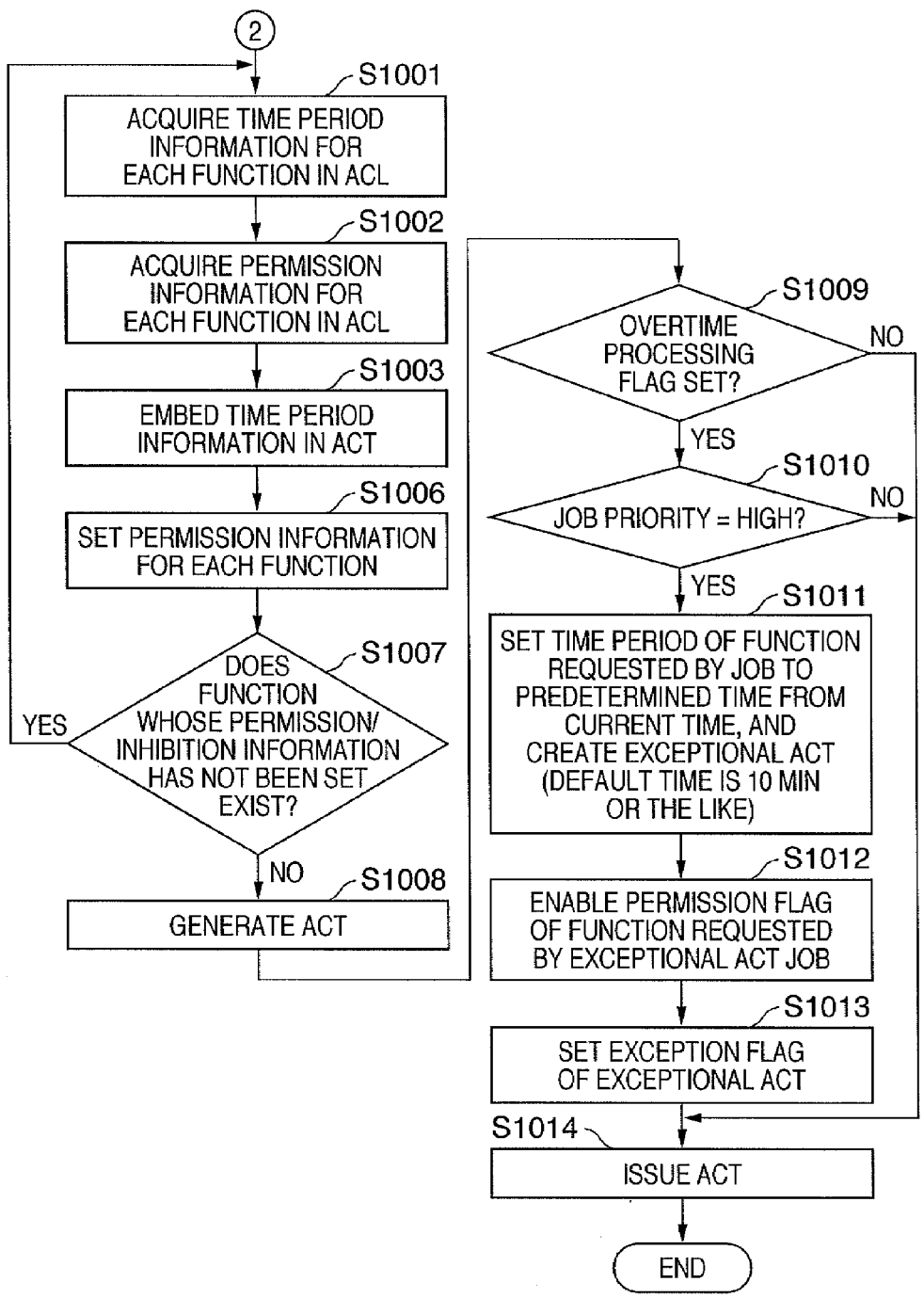
FIG. 21 is a flowchart showing processing for a print request which exceeds the permission time in the third embodiment.

Print request processing in the third embodiment will be described in detail with reference to FIGS. 20 and 21. This print request processing includes processes common to the first and second embodiments, so processes unique to the third embodiment will be mainly explained. In FIGS. 20 and 21, the same step numbers as those in FIGS. 9 and 10 denote the same processes as those in FIGS. 9 and 10.

Processes in S901 to S905 of FIG. 20 have been described with reference to FIG. 9. In S1906, both a regular time ACL table 402 and overtime ACL table 403 are looked up.

In S1907, it is determined whether time information acquired in S905 exhibits the regular time or overtime. In the first embodiment, the ACL table to be looked up is switched based on whether the acquired time information exhibits the regular time or overtime. To the contrary, in the third embodiment, the determination in S1907 is done to switch whether to execute processes in S908 to S913.

If YES in S1907, the process proceeds to the flowchart of FIG. 21; if NO, processes in S908 to S913 are executed.

In FIG. 21, basically the same processing as that described with reference to FIG. 10 is performed. However, the ACLs for all time periods are referred to in S1906, so processes in S1001 to S1006 target all the time periods. In addition, processes in S1004 and S1005 of FIG. 10 are omitted. This is because permission/inhibition of functions associated with job execution during all time periods is set in an ACT generated and issued by the processing of FIG. 21.

As described above, the third embodiment can simplify ACT issue processing in comparison with the first and second embodiments. The third embodiment is effective especially when an ACT requesting apparatus acquires an ACT in advance. In other words, an ACT acquired in advance can be used to issue a print request by the user at arbitrary time.

<Fourth Embodiment>

In the first to third embodiments, the client PC 108 has been exemplified as a typical example of the ACT requesting apparatus. However, the first to third embodiments are applicable to even a case (so-called copy job) where the printing apparatus 107 serving as the ACT requesting apparatus outputs document image data scanned by the scanner of the printing apparatus 107.

The printing apparatus 107 executes the flowchart of FIG. 13A described in the first embodiment when, for example, the user presses a copy start button or logs in to the printing apparatus 107 via an operation to the operation panel.

In the above description, the access control system 102 is an apparatus different from the printing apparatus 107. However, the printing apparatus 107 itself may also function as the access control system 102. The system can be further simplified by incorporating functions equivalent to the access control system 102 into the printing apparatus 107.

<Fifth Embodiment>

In the processing of FIG. 15, when the client PC 903 issues a print processing request, the printer driver 904 running on the client PC 903 requests an ACT of the access control system 901.

To the contrary, in the fifth embodiment, when a client PC 903 issues a print processing request, it is determined whether the print request represents a timer job.

Similar to S1103, the presence/absence of print execution time information is determined in addition to normal print job information. If it is determined that the print request represents a timer job, information on the timer job execution time is acquired, and an ACT request including print execution time information and user information is transmitted to an access control system 901. If it can be determined in advance by these processes that the print request represents a timer job, an ACT corresponding to the actual execution time of the timer job can be acquired in advance.

<Other Embodiments>

The embodiments have been described in detail. The present invention can take embodiments of a system, apparatus, method, program, storage medium (recoding medium), and the like. More specifically, the present invention may also be applied to a system including a plurality of devices (e.g., a host computer, interface device, image capturing apparatus, and Web application), or an apparatus formed by a single device.

The present invention is also achieved by supplying a software program for implementing the functions of the above-described embodiments to a system or apparatus directly or from a remote place, and reading out and executing the supplied program codes by the computer of the system or apparatus. In this case, the program includes programs corresponding to the flowcharts shown in the drawings in the embodiment.

Hence, the program codes installed in the computer to implement functional processing of the present invention by the computer also implement the present invention. That is, the present invention also includes the computer program for implementing functional processing of the present invention.

In this case, the program may take the form of an object code, a program executed by an interpreter, or script data supplied to an OS as long as the functions of the program can be provided.

Examples of the recording medium for supplying the program are a Floppy® disk, hard disk, optical disk, magneto-optical disk, MO, CD-ROM, CD-R, CD-RW, magnetic tape, nonvolatile memory card, ROM, and DVD (DVD-ROM and DVD-R).

The program can also be supplied by the following method. More specifically, a client computer connects to an Internet homepage via the browser of the client computer, and downloads the computer program of the present invention (or a compressed file containing an automatic installing function) from the homepage to a recording medium such as a hard disk. The program can also be supplied by grouping program codes which form the program of the present invention into a plurality of files, and downloading the files from different homepages. That is, the present invention also includes a WWW server which allows a plurality of users to download the program files for implementing functional processing of the present invention by a computer.

It is also possible to encrypt the program of the present invention, store the encrypted program in a storage medium such as a CD-ROM, and distribute the storage medium to users. In this case, a user who satisfies a predetermined condition can download decryption key information from a homepage via the Internet. The user can execute the encrypted program using the key information, and install it in a computer.

Further, the functions of the above-described embodiments are implemented when the computer executes the readout program. The functions of the above-described embodiments can also be implemented when an OS or the like running on the computer performs part or all of actual processing on the basis of the instructions of the program.

The functions of the above-described embodiments are also implemented when the program read out from the recording medium is executed after written in the memory of a function expansion board inserted into the computer or the memory of a function expansion unit connected to the computer. That is, the CPU of the function expansion board or function expansion unit can perform part or all of actual processing on the basis of the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-327634 filed Dec. 4, 2006, and Japanese Patent Application No. 2007-283796 filed Oct. 31, 2007, which are hereby incorporated by reference herein in their entirety.

What is claimed is:

1. A job processing method for an image processing system comprising an information processing apparatus, an access control apparatus, and an image processing apparatus connected by a network, wherein the information processing apparatus requests the image processing apparatus to process a job corresponding to a function of the image processing apparatus, and the access control apparatus issues, to the information processing apparatus, an access control ticket including function restriction information for restricting use of a part of functions of the image processing apparatus for each user, the method comprising:

a request step of causing the information processing apparatus to request the access control ticket including function restriction information for a user from the access control apparatus;

a generation step of causing the access control apparatus to generate the access control ticket including function restriction information for the user in accordance with the request in said request step, wherein the generated access control ticket includes, as the function restriction information, either a first function restriction information for restricting use of a first part of functions of the image processing apparatus or a second function restriction information for restricting use of a second part of functions of the image processing apparatus and exceptionally permitting use of a specific function corresponding to an exception condition;

a reply step of causing the access control apparatus to transmit the access control ticket generated in said generation step to the information processing apparatus;

a first execution step of causing the image processing apparatus to execute the job when the image processing apparatus receives the job and the access control ticket transmitted from the information processing apparatus and when the job uses a function which is not restricted by the function restriction information included in the access control ticket; and a second execution step of causing the image processing apparatus to manage an exceptional log related to a job and execute the job when the image processing apparatus receives the job and the access control ticket transmitted from the information processing apparatus and when the job uses the specific function corresponding to the exception condition based on the second function restriction information included as the function restriction information in the access control ticket, wherein the execution of the job using the specific function corresponding to the exception condition in said second execution step is restricted according to an upper limit of an exceptional output count.

2. The method according to claim 1, wherein when a job and the access control ticket are transmitted from the information processing apparatus to the image processing apparatus and the job uses a function restricted by the function restriction information included in the access control ticket, the job is cancelled.

3. The method according to claim 1, wherein when the request is accepted during a specific time period, said generation step causes the access control apparatus to generate an access control ticket including the second function restriction information.

4. An image processing system comprising an information processing apparatus, an access control apparatus, and an image processing apparatus connected by a network, wherein said information processing apparatus requests said image processing apparatus to process a job corresponding to a function of said image processing apparatus, and said access control apparatus issues, to said information processing apparatus, an access control ticket including function restriction information for restricting use of a part of functions of said image processing apparatus for each user, the system further comprising:

in said information processing apparatus, a request unit configured to request an access control ticket including function restriction information for a user from said access control apparatus;

in said access control apparatus, a generation unit configured to generate the access control ticket including function restriction information for the user in accordance with the request by said request unit, wherein the generated access control ticket includes, as the function restriction information, either first function restriction information for restricting use of a part of functions of the image processing apparatus or second function restriction information for restricting use of a part of functions of said image processing apparatus and exceptionally permitting use of a specific function corresponding to an exception condition;

in said access control apparatus, a reply unit configured to transmit the access control ticket generated by said generation unit to said information processing apparatus;

in said image processing apparatus, a first execution unit configured to execute a job when said image processing apparatus receives the job and the access control ticket transmitted from said information processing apparatus and when the job uses a function which is not restricted by the function restriction information included in the access control ticket; and in said image processing apparatus, a second execution unit configured to manage an exceptional log related to a job and execute the job when said image processing apparatus receives the job and the access control ticket transmitted from said information processing apparatus and when the job uses the specific function corresponding to the exception condition based on the second function restriction information included as the function restriction information in the access control ticket, wherein the execution of the job using the specific function corresponding to the exception condition by said second execution unit is restricted according to an upper limit of an exceptional output count.

5. The system according to claim 4, wherein when a job and the access control ticket are transmitted from said information processing apparatus to said image processing apparatus and the job uses a function restricted by the function restriction information included in the access control ticket, the job is cancelled.

6. The system according to claim 4, wherein when the request is accepted during a specific time period, the generation unit generates an access control ticket including the second function restriction information.

* * * * *